United States Patent
Shen

(10) Patent No.: US 10,732,647 B2
(45) Date of Patent: Aug. 4, 2020

(54) MULTI-SENSOR FUSION FOR ROBUST AUTONOMOUS FLIGHT IN INDOOR AND OUTDOOR ENVIRONMENTS WITH A ROTORCRAFT MICRO-AERIAL VEHICLE (MAV)

(71) Applicant: The Trustees of the University of Pennsylvania, Philadelphia, PA (US)

(72) Inventor: Shaojie Shen, Clear Water Bay (HK)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 15/684,700

(22) Filed: Aug. 23, 2017

(65) Prior Publication Data
US 2018/0088597 A1    Mar. 29, 2018

Related U.S. Application Data

(63) Continuation of application No. 15/165,846, filed on May 26, 2016, now abandoned, which is a
(Continued)

(51) Int. Cl.
*G05D 1/10* (2006.01)
*G01C 21/20* (2006.01)
(Continued)

(52) U.S. Cl.
CPC .......... *G05D 1/102* (2013.01); *B64C 39/024* (2013.01); *B64C 39/028* (2013.01);
(Continued)

(58) Field of Classification Search
CPC ............... B64C 39/024; B64C 39/028; B64C 2201/027; B64C 2201/108;
(Continued)

(56) References Cited

U.S. PATENT DOCUMENTS

| 5,414,631 A | 5/1995 | Denoize et al. |
| 6,278,945 B1 | 8/2001 | Lin |

(Continued)

FOREIGN PATENT DOCUMENTS

| AU | 2013293507 B2 | 3/2017 |
| CN | 101109640 A | 1/2008 |

(Continued)

OTHER PUBLICATIONS

Huh, S., Shim, D., Kim, J.: "Integrated navigation system using camera and gimbaled laser scanner for indoor and outdoor autonomous flight of UAVs". In: Proc. of the IEEE/RSJ Int. Conference on Intelligent Robots and Systems (IROS), Tokyo, Japan, pp. 3158-3163 (Nov. 3-7, 2013) (Year: 2013).*

(Continued)

*Primary Examiner* — Thomas G Black
*Assistant Examiner* — Ce Li Li
(74) *Attorney, Agent, or Firm* — Jenkins, Wilson, Taylor & Hunt, P.A.

(57) ABSTRACT

The subject matter described herein includes a modular and extensible approach to integrate noisy measurements from multiple heterogeneous sensors that yield either absolute or relative observations at different and varying time intervals, and to provide smooth and globally consistent estimates of position in real time for autonomous flight. We describe the development of the algorithms and software architecture for a new 1.9 kg MAV platform equipped with an IMU, laser scanner, stereo cameras, pressure altimeter, magnetometer, and a GPS receiver, in which the state estimation and control are performed onboard on an Intel NUC $3^{rd}$ generation i3 processor. We illustrate the robustness of our framework in large-scale, indoor-outdoor autonomous aerial navigation experiments involving traversals of over 440 meters at
(Continued)

average speeds of 1.5 m/s with winds around 10 mph while entering and exiting buildings.

16 Claims, 21 Drawing Sheets

Related U.S. Application Data continuation of application No. PCT/US2014/067822, filed on Nov. 28, 2014.

(60) Provisional application No. 61/910,022, filed on Nov. 27, 2013.

(51) Int. Cl.
  *G01C 21/16* (2006.01)
  *G01S 19/48* (2010.01)
  *B64C 39/02* (2006.01)

(52) U.S. Cl.
  CPC ........... *G01C 21/165* (2013.01); *G01C 21/20* (2013.01); *G01C 21/206* (2013.01); *G01S 19/48* (2013.01); *B64C 2201/027* (2013.01); *B64C 2201/108* (2013.01); *B64C 2201/141* (2013.01)

(58) Field of Classification Search
  CPC .............. B64C 2201/141; G01C 21/20; G01C 21/165; G01C 21/206; G05D 1/102; G01S 19/48
  See application file for complete search history.

(56) References Cited

U.S. PATENT DOCUMENTS

| | | |
|---|---|---|
| 6,308,911 B1 | 10/2001 | Schroeder |
| 6,422,508 B1 | 7/2002 | Barnes |
| 7,249,730 B1 | 7/2007 | Flippen, Jr. |
| 7,289,906 B2 | 10/2007 | van der Merwe et al. |
| 8,019,544 B2 | 9/2011 | Needelman et al. |
| 8,082,074 B2 | 12/2011 | Duggan et al. |
| 8,380,362 B2 | 2/2013 | Beavin |
| 8,577,539 B1* | 11/2013 | Morrison ............. G01C 21/165 701/28 |
| 8,676,498 B2 | 3/2014 | Ma et al. |
| 8,756,001 B2 | 6/2014 | Georgy et al. |
| 8,768,555 B2 | 7/2014 | Duggan et al. |
| 9,031,809 B1 | 5/2015 | Kumar et al. |
| 9,104,201 B1 | 8/2015 | Pillai et al. |
| 9,129,355 B1 | 9/2015 | Harvey et al. |
| 9,243,916 B2* | 1/2016 | Roumeliotis ........ G01C 21/165 |
| 9,265,187 B2 | 2/2016 | Cavender-Bares et al. |
| 9,488,480 B2 | 11/2016 | Georgy et al. |
| 9,568,321 B2 | 2/2017 | Bharadwaj et al. |
| 9,599,993 B2 | 3/2017 | Kumar et al. |
| 9,607,401 B2* | 3/2017 | Roumeliotis ............. G01S 5/16 |
| 10,037,028 B2 | 7/2018 | Loianno et al. |
| 10,395,115 B2 | 8/2019 | Kumar et al. |
| 2003/0182077 A1 | 9/2003 | Emord |
| 2004/0264761 A1 | 12/2004 | Mas et al. |
| 2005/0251328 A1 | 11/2005 | Merwe et al. |
| 2006/0015247 A1 | 1/2006 | Speer |
| 2007/0032951 A1 | 2/2007 | Tanenhaus et al. |
| 2007/0235592 A1 | 10/2007 | Horn et al. |
| 2008/0125896 A1 | 5/2008 | Troy et al. |
| 2008/0144925 A1 | 6/2008 | Zhu et al. |
| 2008/0195316 A1 | 8/2008 | Krishnaswamy |
| 2009/0256909 A1 | 8/2009 | Nixon |
| 2009/0290811 A1 | 11/2009 | Imani |
| 2010/0084513 A1* | 4/2010 | Gariepy ............... B64C 39/024 244/190 |
| 2010/0114408 A1 | 5/2010 | Goossen |
| 2011/0029235 A1 | 2/2011 | Berry |
| 2011/0029255 A1 | 2/2011 | Hyde et al. |
| 2011/0082566 A1 | 4/2011 | Herr et al. |
| 2012/0078510 A1 | 3/2012 | Ma et al. |
| 2012/0101861 A1 | 4/2012 | Lindores |
| 2012/0203519 A1 | 8/2012 | Louis et al. |
| 2012/0221244 A1 | 8/2012 | Georgy et al. |
| 2012/0245844 A1 | 9/2012 | Lommel et al. |
| 2012/0256730 A1 | 10/2012 | Scott et al. |
| 2012/0286991 A1 | 11/2012 | Chen et al. |
| 2013/0124020 A1 | 5/2013 | Duggan et al. |
| 2013/0131908 A1 | 5/2013 | Trepagnier et al. |
| 2013/0176423 A1 | 7/2013 | Rischmuller et al. |
| 2013/0325346 A1 | 12/2013 | McPeek |
| 2014/0008496 A1 | 1/2014 | Ye et al. |
| 2014/0032167 A1 | 1/2014 | Mayer et al. |
| 2014/0099853 A1 | 4/2014 | Condon et al. |
| 2014/0119716 A1 | 5/2014 | Ohtomo et al. |
| 2014/0138477 A1 | 5/2014 | Keennon et al. |
| 2014/0152837 A1 | 6/2014 | Menon |
| 2014/0152839 A1 | 6/2014 | Menon |
| 2014/0263822 A1 | 9/2014 | Malveaux |
| 2014/0277847 A1 | 9/2014 | Cann et al. |
| 2014/0278029 A1 | 9/2014 | Tonguz et al. |
| 2014/0312165 A1 | 10/2014 | Mkrtchyan |
| 2014/0324253 A1 | 10/2014 | Duggan et al. |
| 2014/0368663 A1 | 12/2014 | Pandey et al. |
| 2014/0372026 A1 | 12/2014 | Georgy et al. |
| 2015/0025713 A1 | 1/2015 | Klinger et al. |
| 2015/0039220 A1 | 2/2015 | Georgy et al. |
| 2015/0149000 A1 | 5/2015 | Rischmuller et al. |
| 2015/0304634 A1 | 10/2015 | Karvounis |
| 2015/0321758 A1 | 11/2015 | Sarna, II |
| 2015/0332489 A1* | 11/2015 | Birchfield ............ G06T 11/206 345/440 |
| 2016/0050840 A1 | 2/2016 | Sauder et al. |
| 2016/0071278 A1* | 3/2016 | Leonard ................. G06T 7/579 348/47 |
| 2016/0132052 A1 | 5/2016 | Seydoux et al. |
| 2016/0139596 A1 | 5/2016 | Na et al. |
| 2016/0200438 A1 | 7/2016 | Bokeno et al. |
| 2016/0209236 A1 | 7/2016 | Steinhardt |
| 2016/0214713 A1 | 7/2016 | Cragg |
| 2016/0214715 A1 | 7/2016 | Meffert |
| 2016/0216119 A1 | 7/2016 | Omr et al. |
| 2017/0023937 A1 | 1/2017 | Loianno et al. |
| 2017/0212529 A1 | 7/2017 | Kumar et al. |
| 2017/0372137 A1 | 12/2017 | Kumar et al. |
| 2019/0072980 A1 | 3/2019 | Kumar et al. |

FOREIGN PATENT DOCUMENTS

| | | |
|---|---|---|
| CN | 101655561 A | 2/2010 |
| CN | 101676744 A | 3/2010 |
| CN | 104718508 B | 9/2017 |
| EP | 3 470 787 A1 | 4/2019 |
| EP | 2 845 071 B1 | 3/2020 |
| EP | 3 470 787 B1 | 4/2020 |
| HK | 1210288 | 8/2018 |
| HK | 1210288 | 9/2018 |
| WO | WO 2014/018147 A2 | 1/2014 |
| WO | WO 2015/105597 A2 | 7/2015 |
| WO | WO 2016/123201 A1 | 8/2016 |
| WO | WO 2017/095493 A2 | 6/2017 |

OTHER PUBLICATIONS

Schmid, F. Ruess, M. Suppa, and D. Burschka, "State Estimation for highly dynamic flying Systems using Key Frame Odometry with varying Time Delays", in IROS, 2012 (Year: 2012).*

Moore, D.C., Huang, A.S., Walter, M., Olson, E., Fletcher, L., Leonard, J., Teller, S.: Simultaneous local and global state estimation for robotic navigation. In: IEEE International Conference on Robotics and Automation, ICRA 2009, pp. 3794-3799 (2009) (Year: 2009).*

Non-Final Office Action for U.S. Appl. No. 15/218,938 (dated Jun. 21, 2017).

(56) References Cited

OTHER PUBLICATIONS

Letter Regarding Decision to Grant for Chinese Application No. 201380034947.8 (dated Jun. 2, 2017).
Notification of Transmittal of the International Search Report and the Written Opinion of the International Searching Authority, or the Declaration for International Application No. PCT/US16/51313 (dated May 19, 2017).
Advisor Action and AFCP 2.0 Decision for U.S. Appl. No. 15/218,938 (dated Apr. 14, 2017).
Non-Final Office Action for U.S. Appl. No. 15/165,846 (dated Feb. 23, 2017).
Final Office Action for U.S. Appl. No. 15/218,938 (dated Feb. 3, 2017).
Letter regarding the second Office Action for Chinese Patent Aplication No. 201380034947.8 (dated Jan. 26, 2017).
Notice of Acceptance for Australian Patent Application No. 2013293507 (dated Nov. 30, 2016).
Notice of Allowance and Fee(s) Due for U.S. Appl. No. 14/397,761 (dated Oct. 4, 2016).
Non-Final Office Action for U.S. Appl. No. 15/218,938 (dated Sep. 29, 2016).
Communication of European publication number and information on the application of Article 67(3) EPC for European Patent Application No. 14878289.9 (dated Sep. 7, 2016).
Notification of First Office Action for Chinese Patent Application No. 201380034947.8 (dated Jun. 3, 2016).
European Search Report and Opinion for EP Application No. 13 823 648.4 (dated May 23, 2016).
Notification of Transmittal of the International Search Report and the Written Opinion of the International Searching Authority, or the Declaration for International Application No. PCT/US2016/015093 (dated May 19, 2016).
Non-Final Office Action for U.S. Appl. No. 14/397,761 (dated Mar. 28, 2016).
Official Office Action for Austrailian Application No. 2013293507 (dated Feb. 4, 2016).
Commonly assigned, co-pending PCT International Patent Application No. PCT/US2016/015093 titled, "Systems, Devices, and Methods for Robotic Remote Sensing for Precision Agriculture," (unpublished, filed Jan. 27, 2016).
Wagner et al., "Subdimensional expansion for multirobot path planning," Artificial Intelligence, vol. 219, pp. 1-24, (2015).
Commonly assigned, co-pending U.S. Appl. No. 62/217,301 titled, "Systems and Methods for Generating Safe Trajectories for Multi-Vehicle Teams," (unpublished, filed Sep. 11, 2015).
Notification of Transmittal of the International Search Report and the Written Opinion of the International Searching Authority, or the Declaration for International Application No. PCT/US2014/067822 (dated Aug. 7, 2015).
Commonly assigned, co-pending U.S. Appl. No. 62/196,762 titled, "Systems, Devices, and Methods for On-Board Sensing and Control of Micro Aerial Vehicles," (unpublished, filed Jul. 24, 2015).
Communication of European publication number and information on the application of Article 67 (3) EPC for Application No. 13823648.4 (dated Feb. 11, 2015).
Shen et al., "Tightly-coupled monocular visual-inertial fusion for autonomous flight of rotorcraft MAVs," IEEE Intl. Conf. on Robot. and Autom., Seattle, Washington, USA (2015).
Goldenberg et al., Enhanced partial expansion A*, Journal of Artificial Intelligence Research, vol. 50, No. 1, pp. 141-187 (2014).
Notification of Transmittal of the International Search Report and the Written Opinion of the International Searching Authority, or the Declaration for International Application No. PCT/US2013/038769 (dated Jan. 17, 2014).
Hesch et al., "Camera-imu-based localization: Observability analysis and consistency improvement," The Intl. Journal of Robotics Research, vol. 33, No. 1, pp. 182-201 (2014).
Thomas et al., "Toward Image Based Visual Servoing for Aerial Grasping and Perching," IEEE Intl. Conf. on Robot. and Autom., Hong Kong, China, pp. 2113-2118 (2014).

Specht E., "The best known packings of equal circles in a square," http://hydra.nat.uni-magdeburg.de/packing/csq/csq.html (Oct. 2013).
Yu et al., "Planning optimal paths for multiple robots on graphs," in Proceedings of 2014 IEEE International Conference on Robotics and Automation (ICRA), pp. 3612-3617, (2013).
Martinelli, "Visual-inertial structure from motion: Observability and resolvability," IEEE/RSJ Intl. Conf. on Intell. Robots and Systems (IROS 2013), pp. 4235-4242 (Nov. 2013).
Schmid et al., "Stereo vision based indoor/outdoor navigation for flying robots," Proc. of the IEEE/RSJ Intl. Cozzi: on Intell. Robots and Syst., Tokyo, Japan, pp. 1-8 (Nov. 2013).
Lynen et al., "A robust and modular multi-sensor fusion approach applied to MAV navigation," Proc. of the IEEE/RSJ Intl. Conf. on Intell. Robots and Syst., Tokyo, Japan, pp. 1-7 (Nov. 2013).
"Kalman filter," Wikipedia, pp. 1-31 http://en.wikipedia.org/wiki/Kalman_filter (page last modified May 24, 2016).
Richter et al., "Polynomial trajectory planning for quadrotor flight," Proc. of the IEEE Intl. Conf on Robot. and Autom., Karlsruhe, Germany, pp. 1-8 (May 2013).
Shen et al., "Vision-based state estimation and trajectory control towards high-speed flight with a quadrotor," Proc. of Robot.: Sci. and Syst., Berlin, Germany, pp. 1-8 (May 2013).
Shen et al., "Vision-based state estimation for autonomous rotorcraft MAVs in complex environments, " Proc. of the IEEE Intl. Conf. on Robot. and Autom., Karlsruhe, Germany, pp. 1-7 (May 2013).
Li et al., "Real-time motion tracking on a cellphone using inertial sensing and a rolling-shutter camera," IEEE International Conference on Robotics and Automation, pp. 4712-4719 (May 2013).
Lee et al., "Nonlinear Robust Tracking Control of a Quadrotor UAV on SE(3)," Asian Journal of Control, vol. 15, No. 2, pp. 391-408 (May 2013).
Zou et al., "CoSLAM: Collaborative visual SLAM in dynamic environments," IEEE Transactions on Pattern Analysis Machine Intelligence, vol. 35, No. 2, pp. 354-366 (2013).
De Wilde et al,. "Push and Rotate: Cooperative Multi-Agent Path Planning," Proceedings of the 2013 International Conference on Autonomous Agents and Multi-agent Systems (AAMAS), p. 87-94 (2013).
Forster et al., "Collaborative monocular SLAM with multiple Micro Aerial Vehicles," IEEE/RSJ Conference on Intelligent Robots and Systems, Tokyo, Japan (2013).
Turpin et al., "CAPT: Concurrent assignment and planning of trajectories for multiple robots," The International Journal of Robotics Research 2014, vol. 33(1) p. 98-112 (2013).
Turpin et al., "Trajectory Design and Control for Aggressive Formation Flight with Quadrotors," Autonomous Robots, vol. 33, pp. 143-156 (Feb. 10, 2012).
Ozaslan et al., "Inspection of Penstocks and Featureless Tunnel-like Environments using Micro UAVs," Field and Service Robotics Conference (FSR), Brisbane, Australia, pp. 123-136 (2013).
Schmid et al., "Towards autonomous MAV exploration in cluttered indoor and outdoor environments," RSS 2013 Workshop on Resource-Eficient Integration of Perception, Control and Navigation for Micro Air Vehicles (MAVs), Berlin, Germany (2013).
Sucan et al., "The Open Motion Planning Library," IEEE Robot. Autom. Mag., vol. 19, No. 4, pp. 72-82 http://ompl.kavrakilab.org (Dec. 2012).
Shen et al., "State Estimation for Indoor and Outdoor Operation with a Micro-Aerial Vehicle," International Symposium on Experimental Robotics (ISER), pp. 1-15 (2012).
Fraundorfer et al., "Vision-based autonomous mapping and exploration using a quadrotor MAV," Proc. of the IEEE/RSJ Intl. Conf on bztell. Robots and Syst., Vilamoura, Algarve, Portugal, pp. 1-8 (Oct. 2012).
Ayanian et al., "Decentralized multirobot control in partially known environments with dynamic task reassignment," IFAC Workshop on Distributed Estimation and Control in Networked Systems, Santa Barbara, CA, pp. 311-316 (Sep. 2012).
Scherer et al., "River mapping from a flying robot: state estimation, river detection, and obstacle mapping," Auton. Robots, vol. 33, No. 1-2, pp. 189-214 (Aug. 2012).

(56) References Cited

OTHER PUBLICATIONS

Kottas et al., "On the consistency of vision-aided inertial navigation," Proc. of the Intl. Sym. on Exp. Robot., Quebec, Canada, pp. 1-15 (Jun. 2012).
Weiss et al., "Real-time onboard visual-inertial state estimation and self-calibration of mays in unknown environments," Proc. of the IEEE Intl. Conf on Robot. and Autom., Saint Paul, MN, pp. 957-964 (May 2012).
De Croon et al., "Sub-sampling: Real-time vision for micro air vehicles," Robot. and Autom. Syst., vol. 60, No. 2, pp. 167-181 (Feb. 2012).
Turpin et al., "Trajectory design and control for aggressive formation flight with quadrotors," Autonomous Robots, vol. 33, pp. 143-156 (Feb. 2012).
Forte et al., "Impedance Control of an Aerial Manipulator," American Control Conference (ACC), Montreal, Canada, pp. 3839-3844 (2012).
Michael et al., "Collaborative mapping of an earthquake-damaged building via ground and aerial robots," Journal of Field Robotics, vol. 29, No. 5, pp. 832-841 (2012).
Shen et al., "Autonomous indoor 3D exploration with a Micro-Aerial Vehicle," IEEE Intl. Conf. on Robot. and Autom., St. Paul, Minnesota, USA, pp. 9-15 (2012).
Tomic et al., "Toward a Fully Autonomous UAV: Research platform for indoor and outdoor urban search and rescue," IEEE Robot. Autom. Mag., vol. 19, No. 3, pp. 46-56 (2012).
Kushleyev et al., "Planning for landing site selection in the aerial supply delivery," Proc. of the IEEE/RSJ Intl. Conf on Intell. Robots and Syst., San Francisco, CA, pp, 1146-1153 (Sep. 2011).
Michael et al., "Control of ensembles of aerial robots," Proc. of the IEEE, vol. 99, No. 9, pp. 1587-1602 (Sep. 2011).
Huang et al., "Visual odometry and mapping for autonomous flight using an RGB-D camera," Proc. of the Intl. Spit. of Robot. Research, Flagstaff, AZ, pp. 1-16 (Aug. 2011).
Bills et al., "Autonomous MAV flight in indoor environments using single image perspective cues," Proc. of the IEEE Intl. Conf. on Robot, and Autom., Shanghai, China, pp. 5776-5783 (May 2011).
Mellinger et al., "Minimum Snap Trajectory Generation and Control for Quadrotors," IEEE International Conference on Robotics and Automation, pp. 2520-2525 (May 2011).
Kuemmerle et al., "g2o: A general framework for graph optimization," Proc. of the IEEE Intl. Conf. on Robot. and Autom., Shanghai, China, pp. 3607-3613 (May 2011).
Shen et al., "Autonomous multi-floor indoor navigation with a computationally constrained MAV," Proc. of the IEEE Intl. Conf on Robot. and Autom., Shanghai, China, pp. 20-25 (May 2011).
De Vries et al., "Cooperative Control of Swarms of Unmanned Aerial Vehicles," 49th AIAA Aerospace Sciences Meeting including the New Horizons Forum and Aerospace Exposition, pp. 1-23 (Jan. 2011).
Jones et al., "Visual-inertial navigation, mapping and localization: A scalable real-time causal approach," International Journal of Robotics Research, pp. 1-38 (Jan. 2011).
Michael et al., "Cooperative manipulation and transportation with aerial robots," Auton. Robots, vol. 30, No. 1, pp. 73-86 (Jan. 2011).
Grzonka et al., "A fully autonomous indoor quadrotor," IEEE Trans. Robot., vol. PP, No. 99, pp. 1-11 (2011).
Bachrach et al., "RANGE-robust autonomous navigation in GPS-denied environments," J. Field Robotics, vol. 28, No. 5, pp. 644-666 (2011).
Weiss et al., "Monocular-SLAM-based navigation for autonomous micro helicopters in GPS denied environments," Journal of Field Robotics, vol. 28, No. 6, pp. 854-874 (2011).
Lee et al., "Geometric tracking control of a quadrotor UAV on SE(3)," Proc. of the Intl. Conf. on Decision and Control, Atlanta, GA, pp. 5420-5425 (Dec. 2010).
Mellinger et al., "Trajectory generation and control for precise aggressive maneuvers," Intl. Symposium on Experimental Robotics (Dec. 2010).

Alonso-Mora et al., "Optimal reciprocal collision avoidance for multiple non-holonomic robots,"Proceedings of the 10th International Symposium on Distributed Autonomous Robotic Systems (DARS), Berlin, Springer Press (Nov. 2010).
Mellinger et al., "Cooperative grasping and transport using multiple quadrotors," Intl. Symposium on Distributed Autonomous Systems, Lausanne, Switzerland (Nov. 2010).
Michael et al., "The Grasp Multiple Micro UAV Test Bed," IEEE Robotics and Automation Magazine, vol. 17, No. 3, pp. 56-65 (Sep. 2010).
Kelly et al., "Visual-inertial sensor fusion: Localization, mapping and sensor-to-sensor self-calibration," pp. 1-53 (Aug. 2010).
Carlson, "Mapping large urban environments with GPS-aided SLAM," Ph.D. dissertation, CMU, Pittsburgh, PA, pp. 1-122 (Jul. 2010).
Mei et al., "RSLAM: A system for large-scale mapping in constant-time using stereo," Intl J. of Computer Vision, pp. 1-17 (Jun. 2010).
Strasdat et al., "Scale drift-aware large scale monocular SLAM," Proc. of Robot.: Sci. and Syst., Zaragoza, Spain, pp. 1-8 (Jun. 2010).
Karaman et al., "Incremental sampling-based algorithms for optimal motion planning," Proc. of Robot.: Sci. and Syst., Zaragoza, Spain pp. 1-8 (Jun. 2010).
Gillula et al., "Design of guaranteed safe maneuvers using reachable sets: Autonomous quadrotor aerobatics in theory and practice," Proc. of the IEEE Intl. Conf. on Robotics and Automation, pp. 1649-1654, Anchorage, AK (May 2010).
Lupashin et al., "A simple learning strategy for high-speed quadrocopter multi-flips," Proc. of the IEEE Intl. Conf. on Robot. and Autom., pp. 1642-1648, Anchorage, AK (May 2010).
Oung et al., "The distributed flight array," Proc. of the IEEE Intl. Conf. on Robotics and Automation, pp. 601-607, Anchorage, AK (May 2010).
He et al., "On the design and use of a micro air vehicle to track and avoid adversaries," The International Journal of Robotics Research, vol. 29, pp. 529-546 (2010).
Oh, "Multisensor Fusion for Autonomous UAV Navigation Based on the Unscented Kalman Filter with Sequential Measurement Updates," IEEE International Conference on Multisensor Fusion and Integration for Intelligent Systems, pp. 217-222 (Sep. 2010).
Bachrach et al., "Autonomous flight in unknown indoor environments," International Journal of Micro Air Vehicles, vol. 1, No. 4, pp. 217-228 (Dec. 2009).
Fink et al., "Planning and control for cooperative manipulation and transportation with aerial robots," Proceedings of the Intl. Symposium of Robotics Research, Luzern, Switzerland (Aug. 2009).
Tedrake, "LQR-Trees: Feedback motion planning on sparse randomized trees," Proceedings of Robotics: Science and Systems, Seattle, WA (Jun. 2009).
Moore et al., "Simultaneous local and global state estimation for robotic navigation," Proc. of the IEEE Intl. Conf. on Robot. and Autom., Kobe, Japan, pp. 3794-3799 (May 2009).
Schleicher et al., "Real-time hierarchical GPS aided visual SLAM on urban environments," Proc. of the IEEE Intl. Conf. on Robot. and Autom., Kobe, Japan, pp. 4381-4386 (May 2009).
Trawny et al., "Cooperative multi-robot localization under communication constraints," IEEE International Conference on Robotics and Automation, Kobe, Japan, pp. 4394-4400 (May 2009).
Esme, "Kalman Filter for Dummies," Bilgin's Blog, pp. 1-15, http://bilgin.esme.org/BitsBytes/KalmanFilterforDummies.aspx (Mar. 2009).
Bullo et al., Distributed Control of Robotic Networks: A Mathematical Approach to Motion Coordination Algorithms. Applied Mathematics Series, Princeton University Press (2009).
Klein et al., "Parallel Tracking and Mapping on a Camera Phone," International Symposium on Mixed and Augmented Reality (ISMAR), pp. 1-4 (2009).
Van den Berg, "Reciprocal n-body collision avoidance," International Symposium on Robotics Research p. 3-19, (2009).
Van den Berg et al., "Centralized path planning for multiple robots: Optimal decoupling into sequential plans," in Proceedings of Robotics: Science and Systems (RSS), (2009).
Van den Berg J., "RVO2 library documentation," http://gamma.cs.unc.edu/RVO2/documentation/2.0/index.html (2008).

(56) References Cited

OTHER PUBLICATIONS

Civera et al., "Inverse depth parameterization for monocular SLAM," IEEE Trans. on Robot., vol. 24, No. 5, pp. 932-945 (Oct. 2008).
Wanger et al., "Robust and Unobtrusive Marker Tracking on Mobile Phones," International Symposium on Mixed and Augmented Reality (ISMAR), pp. 1-7 (Sep. 2008).
Kaess et al., "iSAM: Incremental smoothing and mapping," IEEE Trans. on Robot., manuscript, pp. 1-14 (Sep. 2008).
Kopfstedt et al., "Control of Formations of UAVs for Surveillance and Reconnaissance Missions," Proceedings of the 17th World Congress, The International Federation of Automatic Control, pp. 5161-5166 (Jul. 2008).
Olson, "Robust and efficient robotic mapping," Ph.D. dissertation, MIT, Cambridge, MA, pp. 1-10 (Jun. 2008).
Klein et al., "Parallel tracking and mapping for small AR workspaces," Proc. Sixth IEEE and ACM International Symposium on Mixed and Augmented Reality (ISMAR'07), Nara, Japan, pp. 1-10 (Nov. 2007).
Moreno-Noguer et al., "Accurate non-iterative 0(n) solution to the PnP problem," Proc. of the IEEE Intl. Conf on Computer Vision, Rio de Janeiro, Brazil, pp. 1-8 (Oct. 2007).
Tanner et al., "Flocking in fixed and switching networks," IEEE Trans. Autom. Control, vol. 52, No. 5, pp. 863-868 (May 2007).
Gurdan et al., "Energy-efficient autonomous four-rotor flying robot controlled at 1khz," Proceedings of the IEEE Intl. Conf. on Robotics and Automation, Roma, Italy (Apr. 2007).
Kloder et al., "Path planning for permutation-invariant multirobot formations," IEEE Transactions on Robotics, vol. 22, No. 4, pp. 650-665 (Aug. 2006).
Rosten et al., "Machine learning for high-speed corner detection," Proc. of the European Conf on Computer Vision, Graz, Austria, pp. 1-14 (May 2006).
Bay et al., "SURF: Speeded up robust features," Proc. of the European Conf on Computer Vision, Graz, Austria, pp. 1-14 (May 2006).
Schouwenaars et al., "Multi-vehicle path planning for non-line of sight communications," American Control Conference (2006).
Peng et al., "Coordinating multiple robots with kinodynamic constraints along specified paths," The International Journal of Robotics Research (IJRR), vol. 24, No. 4, pp. 295-310, (2005).
Hastings et al., "Optimization of large-scale, real-time simulations by spatial hashing," Proceedings of the 2005 Summer Computer Simulation Conference pp. 9-17 (2005).
Kamal et al., "Real Time Trajectory Planning for UAVs Using MILP," Proceedings of the 44th IEEE Conference on Decision and Control, and the European Control Conference 2005, pp. 3381-3386 (Dec. 2005).
Foxlin, "Pedestrian Tracking with Shoe-Mounted Inertial Sensors," Computer Graphics and Applications, vol. 25, No. 6, pp. 38-46 (Nov./Dec. 2005).
Van der Merwe et al., "Sigma-Point Kalman Filters for Integrated Navigation," Proc. of AIAA Guidance, Navigation, and Controls Conf., pp. 1-14 (Aug. 2004).
Howard et al., "Multi-robot mapping using manifold representations," IEEE International Conference on Robotics and Automation, New Orleans, Louisiana, pp. 4198-4203 (Apr. 2004).
Lowe, "Distinctive image features from scale-invariant keypoints," International Journal of Computer Vision, vol. 60, No. 2, pp. 91-110 (2004).
Schouwenaars et al., "Receding horizon path planning with implicit safety guarantees," American Control Conference, pp. 5576-5581 (2004).
Ansar et al., "Linear pose estimation from points or lines," IEEE Transactions on Pattern Analysis and Machine Intelligence, vol. 25, No. 5, pp. 1-12 (Apr. 2003).
Roumeliotis et al., "Stochastic cloning: A generalized framework for processing relative state measurements," Proc. of the IEEE Intl. Conf on Robot. and Autom., Washington, DC, pp. 1788-1795 (May 2002).

Desai et al., "Modeling and control of formations of nonholonomic mobile robots," IEEE Trans. Robot., vol. 17, No. 6, pp. 905-908 (Dec. 2001).
Egerstedt et al., "Formation constrained multi-agent control," IEEE Trans. Robot. Autom., vol. 17, No. 6, pp. 947-951 (Dec. 2001).
Beard et al., "A coordination architecture for spacecraft formation control," IEEE Trans. Control Syst. Technol., vol. 9, No. 6, pp. 777-790 (Nov. 2001).
Lefebvre et al., "Comment on 'A new method for the nonlinear transformation of means and covariances in filters and estimators'," IEEE Trans. Autom. Control, vol. 47, No. 8, pp. 1-10 (2001).
Richards et al., "Plume avoidance maneuver planning using mixed integer linear programming,"AIAA Guidance, Navigation and Control Conference and Exhibit (2001).
Schouwenaars et al., "Mixed integer programming for multi-vehicle path planning," European Control Conference, pp. 2603-2608 (2001).
Welch et al., "An Introduction to the Kalman Filter," SIGGRAPH 2001, Course 8, pp. 1-47 (2001).
Tomlin et al., "Conflict resolution for air traffic management: a study in multi-agent hybrid systems," IEEE Transactions on Automatic Control, vol. 43, pp. 509-521, (1998).
Nieuwstadt et al., "Real-time trajectory generation for differentially flat systems," International Journal of Robust and Nonlinear Control, vol. 8, pp. 995-1020 (1998).
Julier et al., "A new extension of the kalman filter to nonlinear systems," Proc. of SPIE, I. Kadar, Ed., vol. 3068, pp. 182-193 (Jul. 1997).
Parrish et al., Animal Groups in Three Dimensions. Cambridge University Press, New York (1997).
Welch et al., "SCAAT: Incremental Tracking with Incomplete Information," University of North Carolina at Chapel Hill, pp. 1-12 (1997).
Buckley S., "Fast motion planning for multiple moving robots," Proceedings of the 1989 IEEE International Conference on Robotics and Automation (ICRA p. 322-326 (1989).
Smith et al., "Estimating uncertain spatial relationships in robotics," Proc. of the IEEE Intl. Conf. on Robot. and Autom., vol. 4, Raleigh, NC, pp. 167-193 (Mar. 1987).
Kant et al., "Toward efficient trajectory planning: The path-velocity decomposition," The International Journal of Robotics Research (IJRR), vol. 5, No. 3, pp. 72-89, (1986).
Erdmann et al., "On multiple moving objects," Algorithmica, vol. 2, pp. 1419-1424, (1986).
Lucas et al., "An iterative image registration technique with an application to stereo vision," Proc. of the 7th Intl. Joint Conf. on Artificial Intelligence, Vancouver, Canada, pp. 674-679 (Aug. 1981).
Maybeck, "Chapter 1 Introduction," Stochastic models, estimation, and control, vol. 1, pp. 1-16, Academic Press, Inc. (1979).
Hart et al., "A formal basis for the heuristic determination of minimum cost paths," IEEE Transactions on Systems Science and Cybernetics, vol. 4, No. 2, pp. 100-107, (Jul. 1968).
"Hummingbird quadrotor," Ascending Technologies, http://www.asctec.de/ (publication date unknown; downloaded from the internet May 25, 2016).
"Pelican quadrotor," Ascending Technologies, GmbH, http://www.asctec.de/ (publication date unknown; dowloaded from the internet May 25, 2016).
Applicant-Initiated Interview Summary for U.S. Appl. No. 15/218,938 (dated Nov. 3, 2017).
Final Office Action for U.S. Appl. No. 15/218,938 (dated Oct. 19, 2017).
Notice of Allowance and Fees Due for U.S. Appl. No. 15/218,938 (dated Mar. 26, 2018).
Advisory Action and AFCP 2.0 Decision for U.S. Appl. No. 15/218,938 (dated Feb. 1, 2018).
Communication pursuant to Article 94(3) EPC for European Patent Application Serial No. 13 823 648.4 (dated Jul. 17, 2018).
Supplemental Notice of Allowability for U.S. Appl. No. 15/218,938 (dated Jul. 5, 2018).
Non-Final Office Action for Chinese Patent Application Serial No. 201480064737.8 (dated Sep. 5, 2018).

(56) References Cited

OTHER PUBLICATIONS

Shen et al. "Vision-Based State Estimation and Trajectory Control Towards High-Speed Flight with a Quadrator," Robotics: Science and Systems 2013, pp. 1-8 (Jun. 24-28, 2013).
Non-Final Office Action for U.S. Appl. No. 15/545,266 (dated Oct. 5, 2018).
Communication under Rule 71(3) EPC Intention to Grant for European Patent Application Serial No. 14 878 289.9 (dated Sep. 19, 2018).
Communication of the extended European search report for European Patent Application Serial No. 18210780.5 (dated Jan. 30, 2019).
Notification of the First Office Action for Chinese Patent Application Serial No. 201480064737.8 (dated Sep. 5, 2018).
Notice of Allowance for U.S. Appl. No. 15/545,266 (dated Apr. 12, 2019).
Office Action for Japanese Patent Application Serial No. 2018-075247 (dated Jul. 2, 2019).
Decision to grant a European patent pursuant to Article 97(1) EPC for European Patent Application Serial No. 13823648.4 (dated Feb. 20, 2020).
Notice of Allowance for Canadian Patent Application Serial No. 2,931,632 (dated Jan. 21, 2020).
Communication under Rule 71(3) EPC Intention to Grant for European Patent Application Serial No. 18 210 780.5 (dated Nov. 5, 2019).
Communication under Rule 71(3) EPC Intention to Grant for European Patent Application Serial No. 13 823 648.4 (dated Sep. 30, 2019).
Non-Final Office Action for U.S. Appl. No. 15/759,292 (dated Mar. 2, 2020).
Decision to grant a European patent pursuant to Article 97(1) EPC for European Patent Application Serial No. 18210780.5 (dated Mar. 19, 2020).

* cited by examiner

POSITION

VELOCITY

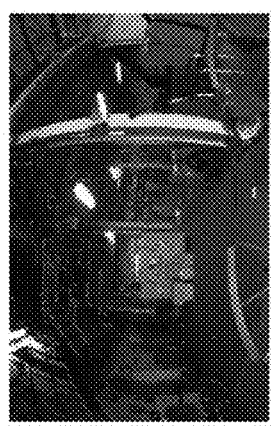
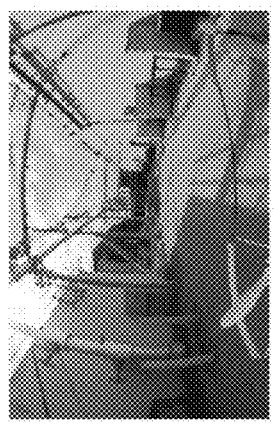
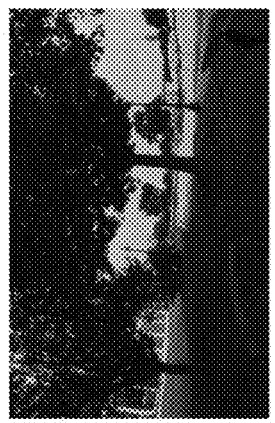
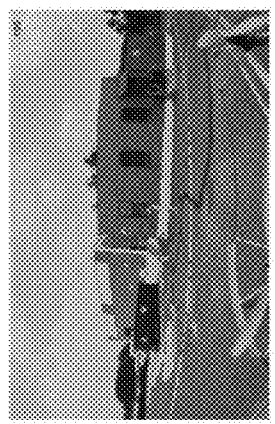
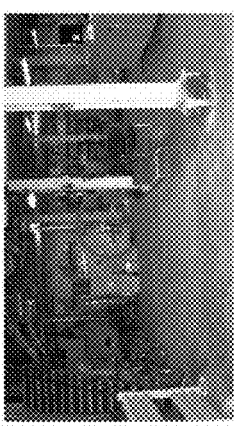
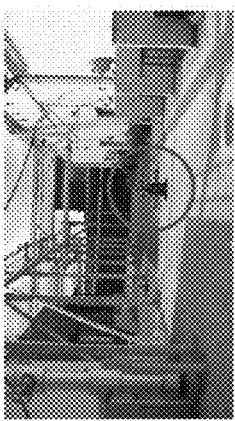
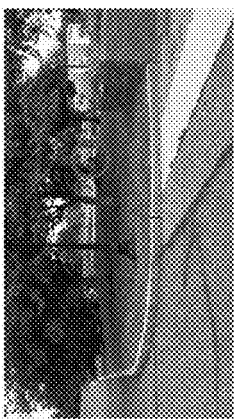
FIG. 6A FIG. 6B FIG. 6C FIG. 6D FIG. 6E FIG. 6F FIG. 6G FIG. 6H THE EXPERIMENTAL PLATFORM WITH LIMITED ONBOARD COMPUTATION (INTEL ATOM 1.6 GHz PROCESSOR) AND SENSING (TWO CAMERAS WITH FISHEYE LENSES AND AN OFF-THE-SHELF INEXPENSIVE IMU). THE PLATFORM MASS IS 740 g.

SYSTEM ARCHITECTURE WITH UPDATE RATES AND INFORMATION FLOW BETWEEN MODULES MARKED.

PERFORMANCE OF BODY FRAME VELOCITY ESTIMATION DURING AUTONOMOUS TRACKING OF THE TRAJECTORY PRESENTED IN SECT. VIII-A

BEFORE TRANSLATION

AFTER TRANSLATION

BEFORE ROTATION

AFTER ROTATION

DESIRED, ESTIMATED, AND ACTUAL TRAJECTORIES

DESIRED, ESTIMATED, AND ACTUAL POSITIONS

SNAPSHOT

ONBOARD IMAGE

POSITION ESTIMATES DURING LOOP CLOSURE

SNAPSHOT

ONBOARD IMAGE

SNAPSHOT

ONBOARD IMAGE

MULTI-SENSOR FUSION FOR ROBUST AUTONOMOUS FLIGHT IN INDOOR AND OUTDOOR ENVIRONMENTS WITH A ROTORCRAFT MICRO-AERIAL VEHICLE (MAV)

PRIORITY CLAIM

This application is a continuation of U.S. patent application Ser. No. 15/165,846, filed May 26, 2016, which is a continuation of PCT International Application No. PCT/US2014/067822, filed Nov. 28, 2014, which claims the benefit of U.S. Provisional Patent Application Ser. No. 61/910,022, filed Nov. 27, 2013, the disclosures of each which are incorporated herein by reference in their entireties.

GOVERNMENT INTEREST

This invention was made with government support under Grant Nos. N00014-07-1-0829, N00014-08-1-0696, N00014-09-1-1031, and N00014-09-1-1051 awarded by the Office of Naval Research, Grant Nos. 1138847, 113830, and 1138110 awarded by the National Science Foundation, Grant Nos. W911NF-08-2-0004 and W911NF-10-2-0016 awarded by the Air Force Office of Science Research, and Grant No. FA9550-10-1-0567 awarded by the Army Research Laboratory. The government has certain rights in the invention.

TECHNICAL FIELD

The subject matter described herein relates to controlling autonomous flight in a micro-aerial vehicle. More particularly, the subject matter described herein relates to multi-sensor fusion for robust autonomous flight in indoor and outdoor environments with a rotorcraft micro-aerial vehicle (MAV).

BACKGROUND

Micro-aerial vehicles, such as rotorcraft micro-aerial vehicles, are capable of flying autonomously. Accurate autonomous flight can be achieved provided that there is sufficient sensor data available to provide control input for the autonomous flight. For example, in some outdoor environments where a global positioning system (GPS) is available, autonomous flight can be achieved based on GPS signals. However, in environments where GPS is not available, such as indoor environments and even outdoor urban environments, autonomous flight based on GPS alone is not possible. In some indoor environments, magnetometer output may not be available or reliable due to magnetic interference caused by structures. Thus, reliance on a single modality of sensor to control flight of a rotorcraft MAV may not be desirable.

Another goal of controlling autonomous flight of a rotorcraft MAV is smooth transition between states when a sensor modality that was not previously available becomes available. For example, when a rotorcraft MAV is flying indoors where GPS is not available and then transitions to an outdoor environment where GPS suddenly becomes available, the rotorcraft may determine that it is far off course and may attempt to correct the error by immediately moving to be on course. It is desirable that such transitions be smooth, rather than having the rotorcraft immediately make large changes in velocity and trajectory to get back on course.

Multiple types of sensor data are available to control autonomous flight in rotorcraft micro-aerial vehicles. For example, onboard cameras, laser scanners, GPS transceivers, and accelerometers can provide multiple inputs that are suitable as control inputs for controlling flight. However, as stated above, relying on any one of these sensors fails when the assumptions associated with the sensor fails. Because each type of sensor produces a unique kind of output with a unique level of uncertainty in its measurement, there exists a need for improved methods, systems, and computer readable media for multi-sensor fusion for robust autonomous flight in indoor and outdoor environments with a rotorcraft MAV.

SUMMARY

The subject matter described herein includes a modular and extensible approach to integrate noisy measurements from multiple heterogeneous sensors that yield either absolute or relative observations at different and varying time intervals, and to provide smooth and globally consistent estimates of position in real time for autonomous flight. We describe the development of the algorithms and software architecture for a new 1.9 kg MAV platform equipped with an inertial measurement unit (IMU), laser scanner, stereo cameras, pressure altimeter, magnetometer, and a GPS receiver, in which the state estimation and control are performed onboard on an Intel NUC $3^{rd}$ generation i3 processor. We illustrate the robustness of our framework in large-scale, indoor-outdoor autonomous aerial navigation experiments involving traversals of over 440 meters at average speeds of 1.5 m/s with winds around 10 mph while entering and exiting buildings.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIGS. 6A-6H depict images from the onboard camera (FIGS. 6A-6D) and an external camera (FIGS. 6E-6H). Note the vast variety of environments, including open space, trees, complex building structures, and indoor environments. We highlight the position of the MAV with a circle. Videos of the experiments are available in the video attachment and at http://mrsl.grasp.upenn.edu/shaojie/ICRA2014.mp4;

DETAILED DESCRIPTION

Figure 1:
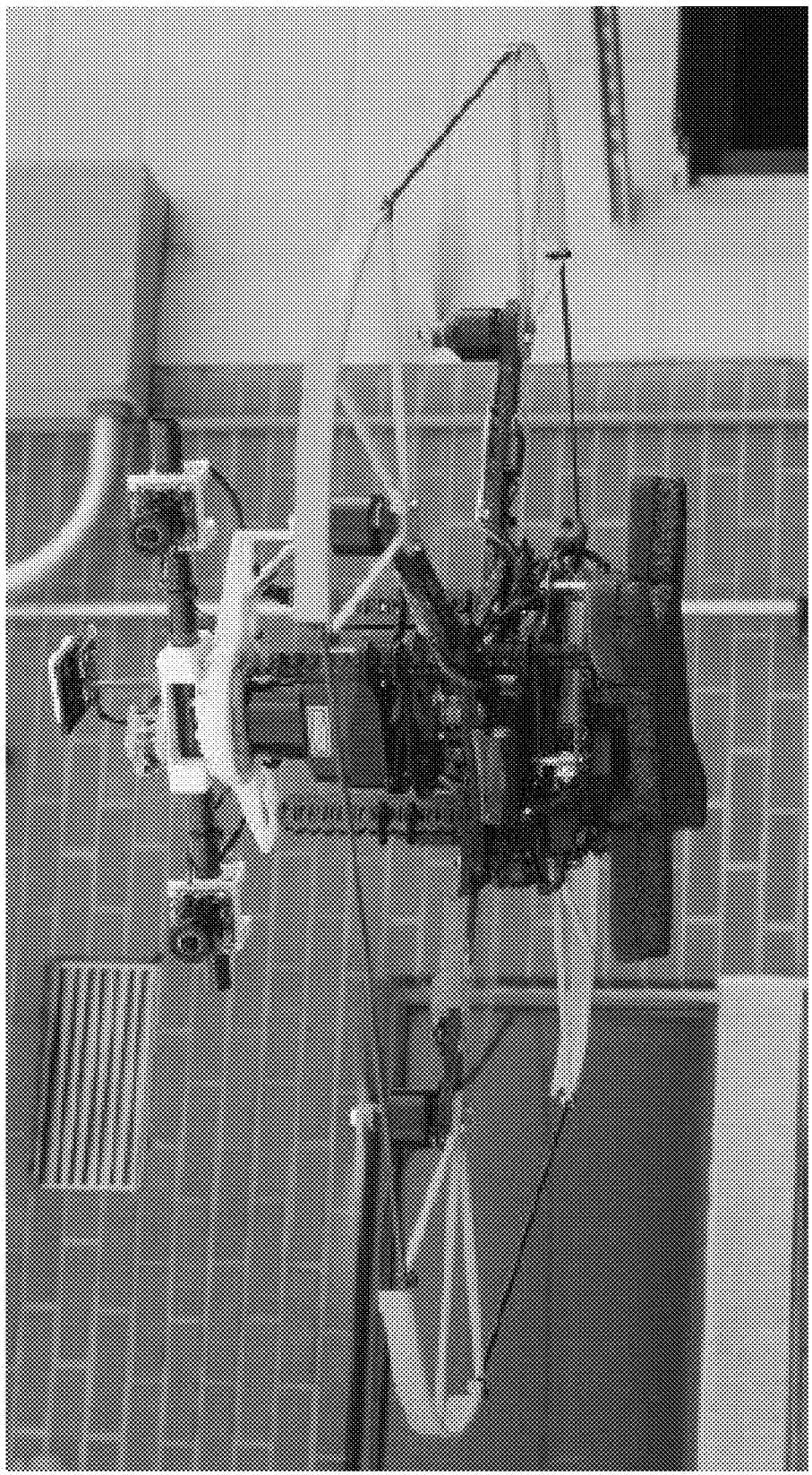
FIG. 1 depicts a 1.9 kg MAV platform equipped with an IMU, laser scanner, stereo cameras, pressure altimeter, magnetometer, and GPS receiver. All the computation is performed onboard on an Intel NUC computer with $3^{rd}$ generation i3 processor.

Rotorcraft micro-aerial vehicles (MAVs) are ideal platforms for surveillance and search and rescue in confined indoor and outdoor environments due to their small size, superior mobility, and hover capability. In such missions, it is essential that the MAV is capable of autonomous flight to minimize operator workload. Robust state estimation is critical to autonomous flight especially because of the inherently fast dynamics of MAVs. Due to cost and payload constraints, most MAVs are equipped with low cost proprioceptive sensors (e.g. MEMS IMUs) that are incapable for long term state estimation. As such, exteroceptive sensors, such as GPS, cameras, and laser scanners, are usually fused with proprioceptive sensors to improve estimation accuracy. Besides the well-developed GPS-based navigation technology [1, 2]. There is recent literature on robust state estimation for autonomous flight in GPS-denied environments using laser scanners [3, 4], monocular camera [5, 6], stereo cameras [7, 81, and RGB-D sensors [9]. However, all these approaches rely on a single exteroceptive sensing modality that is only functional under certain environment conditions. For example, laser-based approaches require structured environments, vision based approaches demand sufficient lighting and features, and GPS only works outdoors. This makes them prone to failure in large-scale environments involving indoor-outdoor transitions, in which the environment can change significantly. It is clear that in such scenarios, multiple measurements from GPS, cameras, and lasers may be available, and the fusion of all these measurements yields increased estimator accuracy and robustness. In practice, however, this extra information is either ignored or used to switch between sensor suites [10].

The main goal of this work is to develop a modular and extensible approach to integrate noisy measurements from multiple heterogeneous sensors that yield either absolute or relative observations at different and varying time intervals, and to provide smooth and globally consistent estimates of position in real time for autonomous flight. The first key contribution, that is central to our work, is a principled approach, building on [11], to fusing relative measurements by augmenting the vehicle state with copies of previous states to create an augmented state vector for which consistent estimates are obtained and maintained using a filtering framework. A second significant contribution is our Unscented Kalman Filter (UKF) formulation in which the propagation and update steps circumvent the difficulties that result from the semi-definiteness of the covariance matrix for the augmented state. Finally, we demonstrate results with a new experimental platform (FIG. 1) to illustrate the robustness of our framework in large-scale, indoor-outdoor autonomous aerial navigation experiments involving traversals of over 440 meters at average speeds of 1.5 m/s with winds around 10 mph while entering and exiting two buildings.

Next, we present previous work on which our work is based. In Section III we outline the modeling framework before presenting the key contributions of UKF-based sensor fusion scheme in Section IV. We bring all the ideas together in our description of the experimental platform and the experimental results in Section VI.

II. Previous Work

We are interested in applying constant computation complexity filtering-based approaches, such as nonlinear variants of the Kalman filter, to fuse all available sensor information. We stress that although SLAM-based multi-sensor fusion approaches [12, 13] yield optimal results, they are computationally expensive for real-time state feedback for the purpose of autonomous control.

While it is straightforward to fuse multiple absolute measurements such as GPS, pressure/laser altimeter in a recursive filtering formulation, the fusion of multiple relative measurements obtained from laser or visual odometry are more involved. It is common to accumulate the relative measurements with the previous state estimates fuse them as pseudo-absolute measurements [5, 14]. However, such fusion is sub-optimal since the resulting global position and yaw covariance is inconsistently small compared to the actual estimation error. This violates the observability properties [6], which suggests that such global quantities are in fact unobservable. As such, we develop our method based on state augmentation techniques [11] to properly account for the state uncertainty when applying multiple relative measurements from multiple sensors.

We aim to develop a modular framework that allows easy addition and removal of sensors with minimum coding and mathematical derivation. We note that in the popular EKF-based formulation [5, 8], the computation of Jacobians can be problematic for complex systems like MAVs. As such, we employ a loosely coupled, derivative-free Unscented Kalman Filter (UKF) framework [1]. Switching from EKF to UKF poses several challenges, which will be detailed and addressed in Sect. IV-A. [15] is similar to our work. However, the EKF-based estimator in [15] does not support fusion of multiple relative measurements.

III. Multi-Sensor System Model

We define vectors in the world and body frames as $(\cdot)^w$ and $(\cdot)^b$ respectively. For the sake of brevity, we assume that all onboard sensors are calibrated and are attached to the body frame. The main state of the MAV is defined as:

$$x = [p^w, \Phi^w, \dot{p}^b, b_a^b, b_\omega^b, b_z^w]^T$$

where $p^w = [x^w, y^w, z^w]^T$ is the 3D position in the world frame, $\Phi^w = [\psi^w, \Theta^w, \phi^w]^T$ is the yaw, pitch, and roll Euler angles that represent the 3-D orientation of the body in the world frame, from which a matrix Rwb that represent the rotation of a vector from the body frame to the world frame can be obtained. $\dot{p}^b$ is the 3D velocity in the body frame. $b_a^b$ and $b_\omega^b$ are the bias of the accelerometer and gyroscope, both expressed in the body frame. $b_z^w$ models the bias of the laser and/or pressure altimeter in the world frame.

We consider an IMU-based state propagation model:

$$u_t = [a^b, \omega^b]^T$$

$$v_t = [v_a, v_\omega, v_{b_a}, v_{b_\omega}, v_{b_z}]^T$$

$$x_{t+1} = f(x_t, u_t, v_t) \quad (1)$$

where u is the measurement of the body frame linear accelerations and angular velocities from the IMU. $v^t \sim N(0, D^t) \in \mathbb{R}^m$ is the process noise. $v_a$ and $v_\omega$ represent additive noise associated with the gyroscope and the accelerometer. $v_{ba}$, $v_{b\omega}$, $v_{bz}$ model the Gaussian random walk of the gyroscope, accelerometer and altimeter bias. The function f(•) is a discretized version of the continuous time dynamical equation [6].

Exteroceptive sensors are usually used to correct the errors in the state propagation. Following [11], we consider measurements as either being absolute or relative, depending the nature of underlying sensor. We allow arbitrary number of either absolute or relative measurement models.

A. Absolute Measurements

All absolute measurements can be modeled in the form:

$$z_{t+m} = h_a(x_{t+m}, n_{t+m}) \quad (2)$$

where $n_{t+m} \sim N(0, Q_t) \in \mathbb{R}^p$ is the measurement noise that can be either additive or not. $h_a(\cdot)$ is in general a nonlinear function. An absolute measurement connects the current state with the sensor output. Examples are shown in in Sect. V-B.

B. Relative Measurements

A relative measurement connects the current and the past states with the sensor output, which can be written as:

$$z_{t+m} = h_r(x_{t+m}, x_t, n_{t+m}) \quad (3)$$

The formulation accurately models the nature of odometry-like algorithms (Sect. V-C and Sect. V-D) as odometry measures the incremental changes between two time instants of the state. We also note that, in order to avoid temporal drifting, most state-of-the-art laser/visual odometry algorithms are keyframe based. As such, we allow multiple future measurement ($m \in \mathcal{M}$, $|\mathcal{M}| > 1$) that corresponds to the same past state $x_t$.

IV. UKF-Based Multi-Sensor Fusion

We wish to design a modular sensor-fusion filter that is easily extensible even for inexperienced users. This means that amount of coding and mathematical deviation for the addition/removal of sensors should be minimal. One disadvantage of the popular EKF-based filtering framework is the requirement of computing the Jacobian matrices, which is proven to be difficult and time consuming for a complex MAV system. As such, we employ the derivative-free UKF based approach [1]. The key of UKF is the approximation of the propagation of Gaussian random vectors through nonlinear functions via the propagation of sigma points. Let $x \sim \mathcal{N}(\hat{x}, P^{xx}) \in \mathbb{R}^n$ and consider the nonlinear function:

$$y = g(x), \quad (4)$$

and let:

$$x = [\hat{x}, \hat{x} \pm (\sqrt{n+\lambda)P^{xx}})_i] \text{ for } i=1, \ldots, n$$

$$y_i = g(x_i), \quad (5)$$

where $g(\bullet)$ is a nonlinear function, $\lambda$ is a UKF parameter. $(\sqrt{(n+\lambda)P^{xx}})_i$ is the $i^{th}$ column of the square root covariance matrix; which is usually computed via Cholesky decomposition. And x are called the sigma points. The mean, covariance of the random vector y, and the cross-covariance between x and y, can be approximated as:

$$\hat{y} = \sum_{i=0}^{2n} w_i^m \mathcal{Y}_i \quad (6)$$

$$p^{yy} = \sum_{i=0}^{2n} w_i^c (\mathcal{Y}_i - \hat{y})(\mathcal{Y}_i - \hat{y})^T$$

$$p^{xy} = \sum_{i=0}^{2n} w_i^c (\mathcal{Y}_i - \hat{y})(\mathcal{X}_i - \hat{x})^T$$

where $\omega_i^m$ and $\omega_i^c$ are weights for the sigma points. This unscented transform can be used to keep track of the covariance in both the state propagation and measurement update, thus avoiding the need of Jacobian-based covariance approximation.

A. State Augmentation for Multiple Relative Measurements

Since a relative measurement depends both the current and past states, it is a violation of the fundamental assumption in the Kalman filter that the measurement should only depend on the current state. One way to deal with this is through state augmentation [11], where a copy of the past state is maintained in the filter. Here we present an extension of [11] to handle arbitrary number of relative measurement models with the possibility that multiple measurements correspond to the same augmented state. Our generic filtering framework allows convenience setup, addition and removal of absolute and relative measurement models.

Note that a measurement may not affect all components in the state x. For example, a visual odometry only affects the 6-DOF (Degree of Freedom) pose, not the velocity or the bias terms. We define the $i^{th}$ augmented state as $x_i \in \mathbb{R}^{n_i}$, $n_i \leq n$. $x_i$ is an arbitrary subset of x. We define a binary selection matrix $B_i$ of size $n_i \times n$, such that $x_i = B_i x$. Consider a time instant, there are I augmented states in the filter, along with the covariance:

$$\check{x} = [\hat{x}, \hat{x}_1, \ldots \hat{x}_I]^T \quad (7)$$

$$\check{p} = \begin{bmatrix} p^{xx} & p^{xx_1} & \cdots & p^{xx_I} \\ p^{x_1 x} & p^{x_1 x_1} & \cdots & p^{x_1 x_I} \\ \vdots & \vdots & \ddots & \vdots \\ p^{x_I x} & p^{x_I x_1} & \cdots & p^{x_I x_I} \end{bmatrix}$$

The addition of a new augmented state $x_I+1$ can be done by:

$$\check{x}^+ = M^+ \check{x}, \; M^+ = \begin{bmatrix} I_n + \sum_I n_i \\ B_{I+1} \end{bmatrix} \quad (8)$$

Similarly, the removal of an augmented state $x_j$ is given as:

$$\check{x}^- = M^- \check{x}, \; M^- = \begin{bmatrix} I_a & O_{a \times n_j} & O_{a \times b} \\ O_{b \times n} & O_{b \times n_j} & I_b \end{bmatrix},$$

where $a = n + \Sigma_{i+1}^{j-1} n_i$ and $b = \Sigma_{i=j+1}^{I} n_i$. The updated augmented state covariance is given as:

$$\check{P}^\pm = M^\pm \check{P} M^{\pm T}.$$

The change of keyframes in a odometry-like measurement model is simply the removal of an augmented state $x_j$ followed by the addition of another augmented state with the same $B_j$. Since we allow multiple relative measurements that correspond to the same augmented state, contrast to [11], augmented states are not deleted after measurement updates (Sect. IV-D).

This state augmentation formulation works well in an EKF setting, however, it poses issues when we try to apply it to the UKF. Since the addition of a new augmented state (8) is essentially a copy of the main state. The resulting covariance matrix $\check{P}^+$ will not be positive definite, and the Cholesky decomposition (5) for state propagation will fail (non-unique). We now wish to have something that is similar to the Jacobian matrices for EKF, but without explicitly computing the Jacobians.

B. Jacobians for UKF

In [16], the authors present a new interpretation of the UKF as a Linear Regression Kalman Filter (LRKF). In LRKF, we seek to find the optimal linear approximation $y = Ax + b + e$ of the nonlinear function (4) given a weighted discrete (or sigma points (6)) representation of the distribution $N(\hat{x}, P^{xx})$. The objective is to find the regression matrix A and vector b that minimize the linearization error e:

$$\min_{A, b} \sum_{i=0}^{2n} w_i (\mathcal{Y}_i - A\mathcal{X}_i - b)(\mathcal{Y}_i - A\mathcal{X}_i - b)^T.$$

As shown in [16], the optimal linear regression is given by:

$$A = P^{yx} P^{xx-1}, \; b = \hat{y} - A\hat{x} \quad (9)$$

The linear regression matrix A in (9) serves as the linear approximation of the nonlinear function (4). It is similar to the Jacobian in the EKF formulation. As such, the propagation and update steps in UKF can be performed in a similar fashion as EKF.

C. State Propagation

Observing the fact that during state propagation only the main state changes, we start off by partitioning the augmented state and the covariance (7) into:

$$\check{x}_{t|t} = \begin{bmatrix} \hat{x}_{t|t} \\ \hat{x}_{I_{t|t}} \end{bmatrix}, \; \check{P}_{t|t} = \begin{bmatrix} P^{xx}_{t|t} & P^{xx_I}_{t|t} \\ P^{x_I x}_{t|t} & P^{x_I x_I}_{t|t} \end{bmatrix}.$$

The linear approximation of the nonlinear state propagation (1), applied on the augmented state (7), is:

$$\check{x}_{t+1|t} = f(\check{x}_{t|t}, u_t, v_t) \quad (10)$$

$$= \begin{bmatrix} F_t & O \\ O & I_{|l|} \end{bmatrix} \check{x}_{t|t} + \begin{bmatrix} J_t & G_t \\ O & O \end{bmatrix} \begin{bmatrix} u_t \\ v_t \end{bmatrix} + b_t + e_t,$$

from which we can see that the propagation of the full augmented state is actually unnecessary since the only nontrivial regression matrix corresponds to the main state. We can propagate only the main state x via sigma points generated from $P_{t|t}^{xx}$ and use the UKF Jacobian $F_t$ to update the cross covariance $P_{t|t}^{xx_l}$. Since the covariance matrix of the main state $P_{t|t}^{xx}$ is always positive definite, we avoid the Cholesky decomposition failure problem.

Since the process noise is not additive, we augment the main state with the process noise and generate sigma points from:

$$\overline{x}_{t|t} = \begin{bmatrix} \hat{x}_{t|t} \\ O \end{bmatrix}, \overline{P}_{t|t} = \begin{bmatrix} P_{t|t}^{xx} & O \\ O & D_t \end{bmatrix}. \quad (11)$$

The state is then propagated forward by substituting (11) into (1), (5) and (6). We obtain $\hat{x}_{t+1|t}$, the estimated value of x at time t+1 given the measurements up to t, as well as $P_{t+1|t}^{xx}$ and $P_{t+1|t}^{\check{x}\check{x}}$. Following (9), we know that:

$$P_{t+1|t}^{x\check{x}} \overline{P}_{t|t}^{-1} = [F_t, G_t].$$

The propagated augmented state and its covariance is updated according to (10):

$$\check{x}_{t+1|t} = \begin{bmatrix} \hat{x}_{t+1|t} \\ \hat{x}_{t_l|t} \end{bmatrix}, \check{P}_{t+1|t} = \begin{bmatrix} P_{t+1|t}^{xx} & F_t P_{t|t}^{xx_l} \\ P_{t|t}^{x_lx} F_t^T & P_{t|t}^{x_lx_l} \end{bmatrix}. \quad (12)$$

D. Measurement Update

Let there be m state propagations between two measurements, and we maintain $\check{x}_{t+m|t}$ and $\check{P}_{t+m|t}$ as the newest measurement arrives. Consider a relative measurement (3) that depends on the $j^{th}$ augmented state, the measurement prediction and its linear regression approximation can be written as:

$$\hat{z}_{t+m|t} = h_r(\hat{x}_{t+m|t}, B_j^T \hat{x}_{j_{t+m|t}}, n_{t+m})$$

$$= H_{t+m|t}\check{x}_{t+m|t} + L_{t+m}n_{t+m} + b_{t+m} + e_{t+m}$$

$$H_{t+m|t} = [H_{t+m|t}^x, O, H_{t+m|t}^{x_j}, O].$$

Again, since only the main state and one augmented state are involved in each measurement update, we can construct another augmented state together with the possibly non-additive measurement noise:

$$\check{x}_{t+m|t} = \begin{bmatrix} \hat{x}_{t+m|t} \\ \hat{x}_{j_{t+m|t}} \\ O \end{bmatrix}, \check{P}_{t+m|t} = \begin{bmatrix} P_{t+m|t}^{xx} & P_{t+m|t}^{xx_j} & O \\ P_{t+m|t}^{x_jx} & P_{t+m|t}^{x_jx_j} & O \\ O & O & Q_{t+m} \end{bmatrix}.$$

After the state propagation (12), $\check{P}_{t+m|t}$ is guaranteed to be positive definite, thus it is safe to perform sigma point propagation as in (5) and (6). We obtain $\hat{z}_{t+m|t}$, $P_{t+m|t}^{zz}$, $P_{t+m|t}^{\check{z}x}$, and:

$$P_{t+m|t}^{z\check{x}} \check{P}_{t+m|t}^{-1} = [H_{t+m|t}^x, H_{t+m|t}^{x_j}, L_{t+m}].$$

We can apply the measurement update similar to an EKF:

$$\check{K}_{t+m} = \check{P}_{t+m|t} H_{t+m|t}^T P_{t+m|t}^{zz-1}$$

$$\check{x}_{t+m|t+m} = \check{x}_{t+m|t} + \check{K}_{t+m}(z_{t+m} - \hat{z}_{t+m|t})$$

$$\check{P}_{t+m|t+m} = \check{P}_{t+m|t} - \check{K}_{t+m} H_{t+m|t} \check{P}_{t+m|t}$$

where $z_{t+m}$, is the actual sensor measurement. Both the main and augmented states will be corrected during measurement update. We note that entries in $H_{t+m|t}$ that correspond to inactive augmented states are zero. This can be utilized to speed up the matrix multiplication.

The fusion of absolute measurements can simply be done by $\hat{x}_{j+m|t} = \emptyset$ and applying the corresponding absolute measurement model (2).

Figure 9:
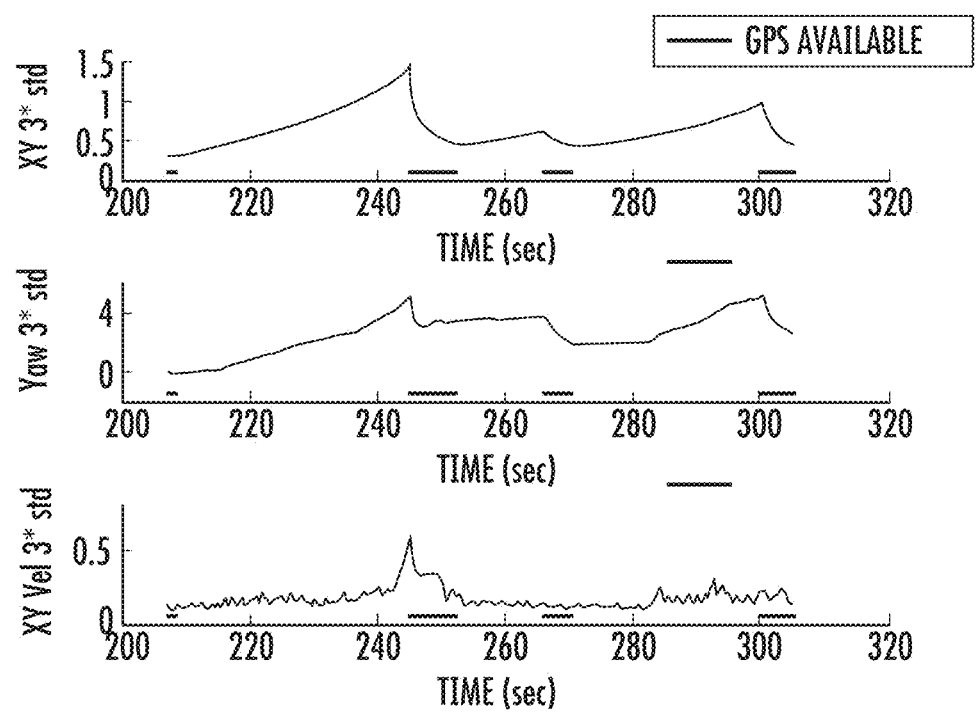
FIG. 9 illustrates covariance changes as the vehicle flies through a dense building area (between 200 s-300 s, top of FIG. 7). The GPS comes in and out due to building shadowing. The covariance of x, y, and yaw increases as GPS fails and decreases as GPS resumes. Note that the body frame velocity are observable regardless of GPS measurements, and thus its covariance remains small The spike in the velocity covariance is due to the vehicle directly facing the sun. The X-Y covariance is calculated from the Frobenius norm of the covariance submatrix.

As shown in FIG. 9, fusion of multiple relative measurements results in slow growing, but unbounded covariance in the global position and yaw. This is consistent with results in [6] that these global quantities are unobservable.

E. Delayed, Out-Of-Order Measurement Update

When fusing multiple measurements, it is possible that the measurements arrive out-of-order to the filter, that is, a measurement that corresponds to an earlier state arrives after the measurement that corresponds to a later state. This violates the Markov assumption of the Kalman filter. Also, due to the sensor processing delay, measurements may run behind the state propagation.

Figure 2:
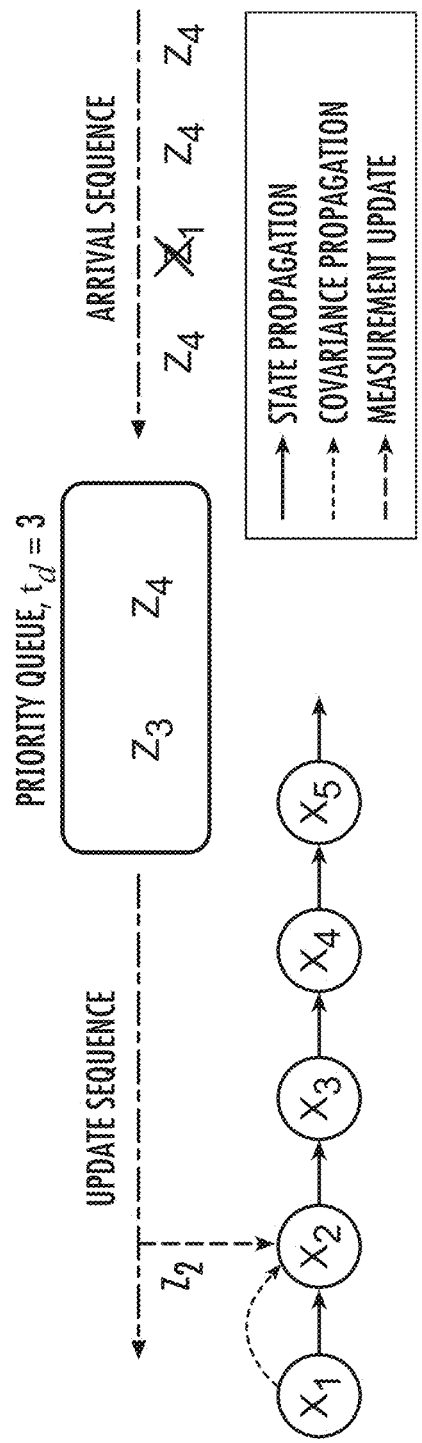
FIG. 2 depicts delayed, out-of-order measurement with a priority queue. While $z_4$ arrives before $z_2$, $z_2$ is first applied to the filter. $z_4$ is temporary stored in the queue. $z_1$ is discarded since it is older than $t_d$ from the current state. The covariance is only propagated up to the time where the most recent measurement is applied to the filter. The state is propagated until the most recent IMU input.

We address these two issues by storing measurements in a priority queue, where the top of the queue corresponds to the oldest measurement. A pre-defined a maximum allowable sensor delay $t_d$ of 100 ms was set for our MAV platform. Newly arrived measurements that corresponded to a state older than $t_d$ from the current state (generated by state propagation) are directly discarded. After each state propagation, we check the queue and process all measurements in the queue that are older than $t_d$. The priority queue essentially serves as a measurement reordering mechanism (FIG. 2) for all measurements that are not older than $t_d$ from the current state. In the filter, we always utilize the most recent IMU measurement to propagate the state forward. We, however, only propagate the covariance on demand. As illustrated in FIG. 2, the covariance is only propagated from the time of the last measurement to the current measurement.

F. An Alternative Way for Handling Global Pose Measurements

Figure 3A:
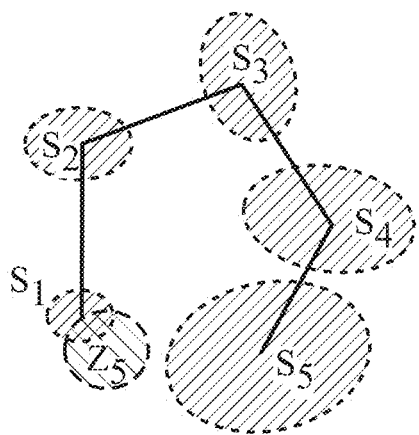
FIGS. 3A and 3B illustrate that GPS signal is regained at k=5, resulting in large discrepancies between the measurement $z_5$ and the state $s_5$ (FIG. 3A). Pose graph SLAM produces a globally consistent graph (FIG. 3B)

As the vehicle moves through the environment, global pose measurements from GPS and magnetometer may be available. It is straightforward to fuse the GPS as a global pose measurement and generate the optimal state estimate. However, this may not be the best for real-world applications. A vehicle that operates in a GPS-denied environment may suffer from accumulated drift. When the vehicle gains GPS signal, as illustrated in FIG. 3A, there may be large discrepancies between the GPS measurement and the estimated state ($z_5$-$s_5$). Directly applying GPS as global measurements will result in undesirable behaviors in both estimation (large linearization error) and control (sudden pose change).

This is not a new problem and it has been studied for ground vehicles [17] under the term of local frame-based navigation. However, [17] assumes that a reasonably accurate local estimate of the vehicle is always available (e.g. wheel odometry). This is not the case for MAVs since the state estimate with only the onboard IMUs drifts away vastly within a few seconds. The major difference between an IMU and the wheel odometry is that an IMU drifts temporally, but the wheel odometry only drifts spatially. However, we have relative exteroceptive sensors that are able to produce temporally drift-free estimates. As such, we only need to deal with the case that all relative exteroceptive sensors have failed. Therefore, our goal is to properly transform the global GPS measurement into the local frame to bridge the gap between relative sensor failures.

Consider a pose-only graph SLAM formulation with $s_k=[x_k^w, y_k^w, \psi_k^w]^T \in \Theta$ being 2D poses. We try find the optimal configuration of the pose graph given incremental motion constraints $d_k$ from laser/visual odometry, spatial loop closure constraints $l_k$, and absolute pose constraints $z_k$ from GPS:

$$\min_{\Theta} \left\{ \sum_{k=1}^{M} \|h_i(s_{k-1}, d_k) - s_k\|_{P_k^d}^2 + \sum_{k=1}^{L} \|h_l(s_k, 1_k) - s_{l(k)}\|_{P_k^l}^2 + \sum_{k=1}^{N} \|z_k - s_k\|_{P_k^z}^2 \right\}.$$

Figure 3B:
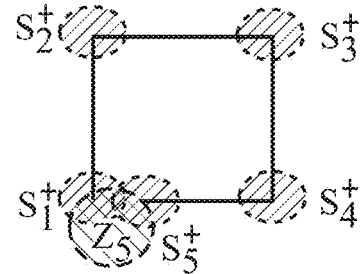

The optimal pose graph configuration can be found with available solvers [18], as shown in FIG. 3B. The pose graph is disconnected if there are no relative exteroceptive measurements between two nodes. Let two pose graphs be disconnected between k−1 and k.

Figure 4A:
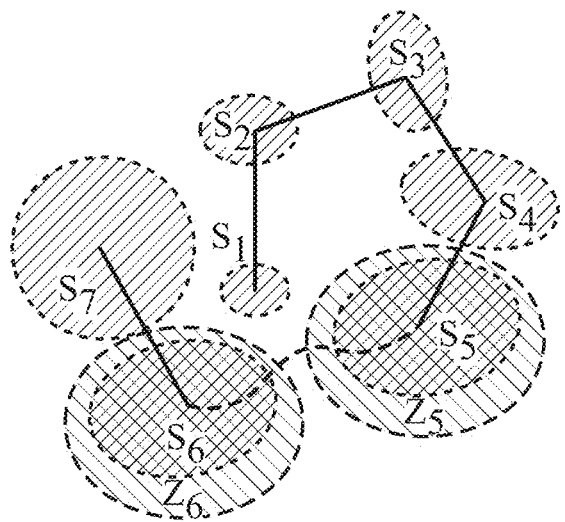
FIGS. 4A and 4B illustrate the alternative GPS fusion, the discrepancy between transformed GPS measurement $z_5$ and the non-optimized state $s_5$ is minimized. Fusion of such indirect GPS measurement will lead to a smooth state estimate (dashed line between $s_6$ and $s_5$)
Figure 4B:
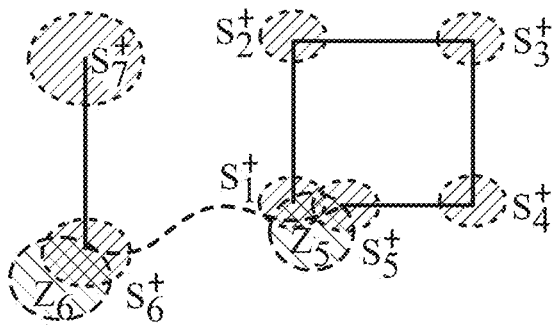

The pose graph SLAM provides the transformation between the non-optimized $s_{k-1}$ and the SLAM-optimized $s_{k-1}^+$ state. This transform can be utilized to transform the global GPS measurement to be aligned with $s_{k-1}$:

$$\Delta_{t-1} = s_{k-1} \ominus s_{k-1}^+$$

$$z_{k-1}^- = \Delta_{t-1} \oplus z_{k-1}$$

where $\oplus$ and $\ominus$ are pose compound operations as defined in [19]. The covariance $P_{t-1}^\Delta$ of $\Delta_{t-1}$ and subsequently the covariance $P_{t-1}^z$ of $z_{k-1}^-$ can be computed following [19]. This formulation minimizes the discrepancies between $z_{k-1}^-$ and $s_{k-1}$, and thus maintains smoothness in the state estimate. The transformed GPS $z_{k-1}^-$, is still applied as an absolute measurement to the UKF (FIG. 4A and FIG. 4B).

However, despite the large scale in our field experiments (Sect. VI), we hardly find a case that the accumulated drift is large enough to cause issues with direct GPS fusion. In the future, we will seek for even larger scale experiments to verify the necessity of the above local frame-based approach.

V. Implementation Details

A. Experimental Platform

The experimental platform shown in FIG. 1 is based on the Pelican quadrotor from Ascending Technologies, GmbH (http://www.asctec.de/). This platform is natively equipped with an AutoPilot board consisting of an IMU and a user-programmable ARM7 microcontroller. The main computation unit onboard is an Intel NUC with a 1.8 GHz Core i3 processor with 8 GB of RAM and a 120 GB SSD. The sensor suite includes a ublox LEA-6T GPS module, a Hokuyo UTM-30LX LiDAR and two mvBlueFOX-1VILC200w grayscale HDR cameras with fisheye lenses that capture 752×480 images at 25 Hz. We use hardware triggering for frame synchronization. The onboard auto exposure controller is fine tuned to enable fast adaption during rapid light condition changes. A 3-D printed laser housing redirects some of the laser beams for altitude measurement. The total mass of the platform is 1.87 kg. The entire algorithm is developed in C++ using robot operating system (ROS) (http://www.ros.org) as the interfacing robotics middleware.

B. Absolute Measurements

Some onboard sensors are capable of producing absolute measurements (Sect. 111-A), here are their details:

1) GPS And Magnetometer:

$$z_t = \begin{bmatrix} \begin{pmatrix} x_t^w \\ y_t^w \end{pmatrix} \\ R_b^w \begin{pmatrix} x_t^b \\ y_t^b \end{pmatrix} \\ \psi_t^w \end{bmatrix} + n_t.$$

2) Laser/Pressure Altimeter:

$$z_t = z_t^w + b_{z_t}^w + n_t$$

3) Pseudo Gravity Vector: If the MAVs is near hover or moving at approximately constant speed, we may say that the accelerometer output provides a pseudo measurement of the gravity vector. Let $g=[0, 0, g]^T$, we have:

$$z_t = R_b^{wT} g^w + b_{at}^b + n_t.$$

C. Relative Measurement—Laser-Based Odometry

We utilize the laser-based odometry that we developed in our earlier work [4]. Observing that man-made indoor environments mostly contains vertical walls, we can make a 2.5-D environment assumption. With this assumption, we can make use of the onboard roll and pitch estimates to project the laser scanner onto a common ground plane. As such, 2D scan matching can be utilized to estimate the incremental horizontal motion of the vehicle. We keep a local map to avoid drifting while hovering.

$$z_{t+m} = \ominus_{2d} \begin{bmatrix} x_t^w \\ y_t^w \\ \psi_t^w \end{bmatrix} \oplus_{2d} \begin{bmatrix} x_{t+m}^w \\ y_{t+m}^w \\ \psi_{t+m}^w \end{bmatrix} + n_{t+m},$$

where $P_{2dt}=[x_t^w, y_t^w, \psi_t^w]^T$, $\oplus_{2d}$ and $\ominus_{2d}$ are the 2-D pose compound operations as defined in [19].

D. Relative Measurement—Visual Odometry

We implemented a classic keyframe-based visual odometry algorithm. Keyframe-based approaches have the benefit of temporally drift-free. We choose to use light-weight corner features but run the algorithm at a high-rate (25 Hz). Features are tracked across images via KLT tracker. Given a keyframe with a set of triangulated feature points, we run a robust iterative 2D-3D pose estimation [8] to estimate the 6-DOF motion of the vehicle with respect to the keyframe. New keyframes are inserted depending on the distance traveled and the current number of valid 3D points.

$$z_{t+m} = \ominus \begin{bmatrix} P_t^w \\ \Phi_t^w \end{bmatrix} \oplus \begin{bmatrix} P_{t+m}^w \\ \Phi_{t+m}^w \end{bmatrix} + n_{t+m}$$

E. Feedback Control

To achieve stable flight across different environments with possibly large orientation changes, we choose to use a position tracking controller with a nonlinear error metric [20]. The 100 Hz filter output (Sect. IV) is used directly as the feedback for the controller. In our implementation, the attitude controller runs at 1 kHz on the ARM processor on the MAV's AutoPilot board, while the position tracking control operates at 100 Hz on the main computer. We implemented both setpoint trajectory tracking and velocity control to allow flexible operations.

VI. Experimental Results

Multiple experiments are conducted to demonstrate the robustness of our system. We begin with an quantitative evaluation in a lab environment equipped with a motion capture systems. We then test our system in two real-world autonomous flight experiments, including an industrial complex and a tree-lined campus.

A. Evaluation of Estimator Performance

Figure 5A:
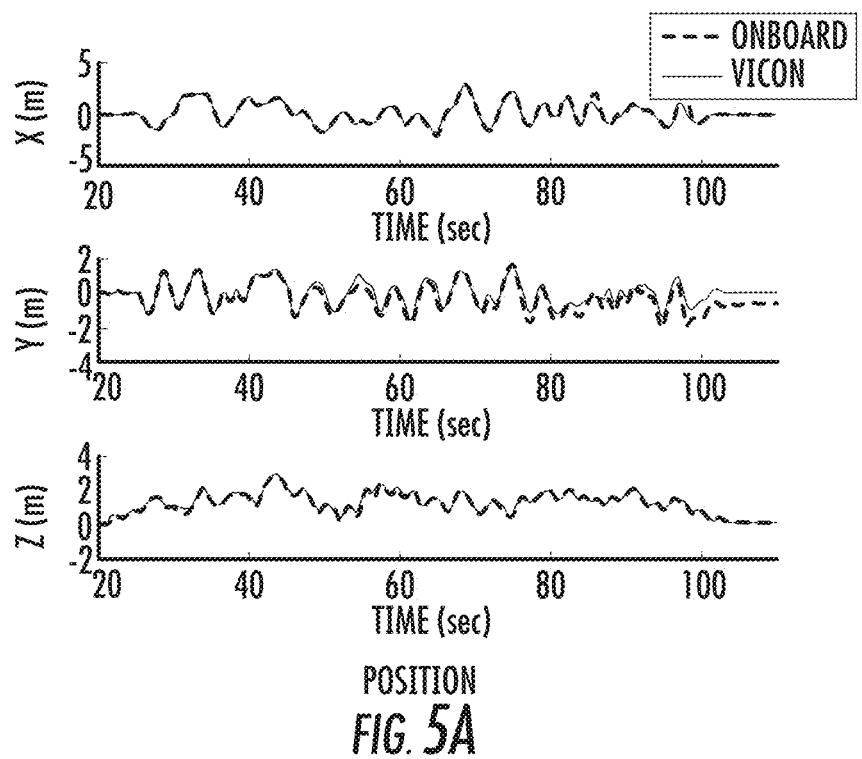
FIGS. 5A and 5B depict that the MAV maneuvers aggressively with a maximum speed of 3.5 m/s (FIG. 5B). The horizontal position also compares well with the ground truth with slight drift (FIG. 5A)
Figure 5B:
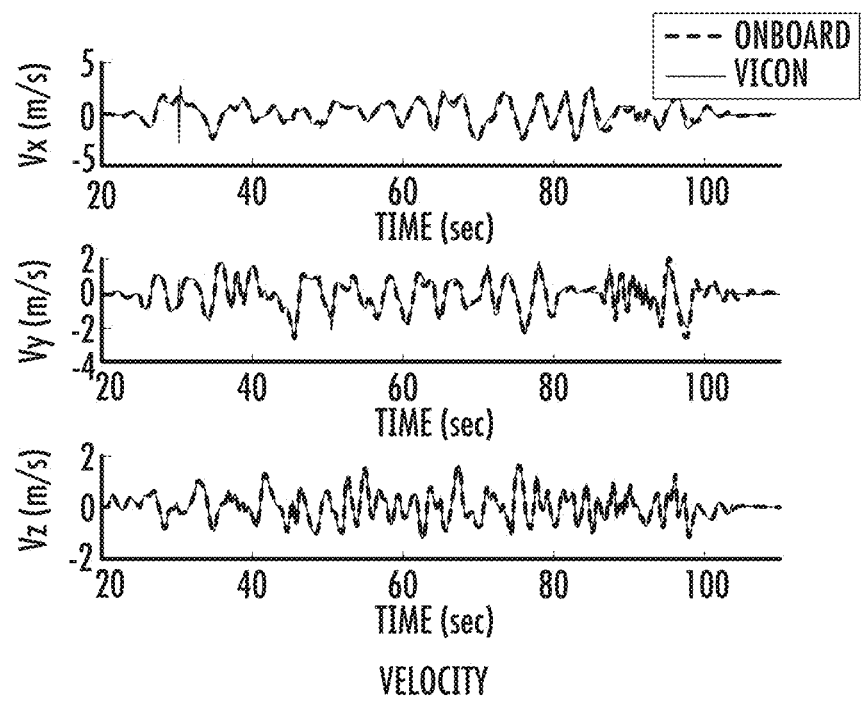

We would like to push the limits of our onboard estimator. Therefore, we have a professional pilot to aggressively fly the quadrotor with a 3.5 m/s maximum speed and large attitude of up to 40°. The onboard state estimates are compared the ground truth from the motion capture system. Since there is no GPS measurement indoors, our system relies on a fusion of relative measurements from laser and vision. We do observe occasional laser failure due to large attitude violating the 2.5-D assumption (Sect. V-C). However, the multi-sensor filter still tracks the vehicle state throughout (FIG. 5A). We do not quantify the absolute pose error since it is unbounded. However, the body frame velocity (FIG. 5B) compares well with the ground truth with standard deviations of $\{0.1021, 0.1185, 0.0755\}^T$ (m/s) in x, y, and z, respectively.

B. Autonomous Flight in Large-Scale Indoor and Outdoor Environments

Figure 7:
FIG. 7 depicts a vehicle trajectory aligned with satellite imagery. Different colors indicate different combinations of sensing modalities. G=GPS, V=Vision, and L=Laser.
Figure 8:
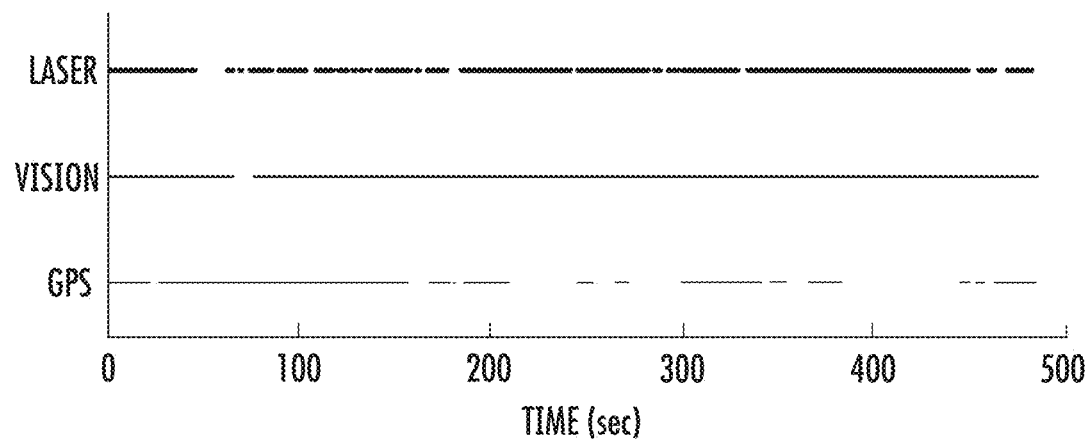
FIG. 8 illustrates sensor availability over time. Note that failures occurred to all sensors. This shows that multi-sensor fusion is a must for this kind of indoor-outdoor missions.

We tested our system in a challenging industrial complex. The testing site spans a variety of environments, including outdoor open space, densely filled trees, cluttered building area, and indoor environments (FIGS. 6A-6H). The MAV is autonomously controlled using the onboard state estimates. However, a human operator always has the option of sending high level waypoints or velocity commands to the vehicle. The total flight time is approximately 8 minutes, and the vehicle travels 445 meters with an average speed of 1.5 m/s. As shown in the map-aligned trajectory (FIG. 7), during the experiment, frequent sensor failures occurred (FIG. 8), indicating the necessity of multi-sensor fusion. FIG. 9 shows the evolution of covariance as the vehicle flies through a GPS shadowing area. The global x, y and yaw error is bounded by GPS measurement, without which the error will grow unbounded. This matches the observability analysis results. It should be noted that the error on body frame velocity does not grow, regardless of the availability of GPS. The spike in velocity covariance in FIG. 9 is due to the camera facing direct sunlight.

C. Autonomous Flight in Tree-Lined Campus

Figure 10:
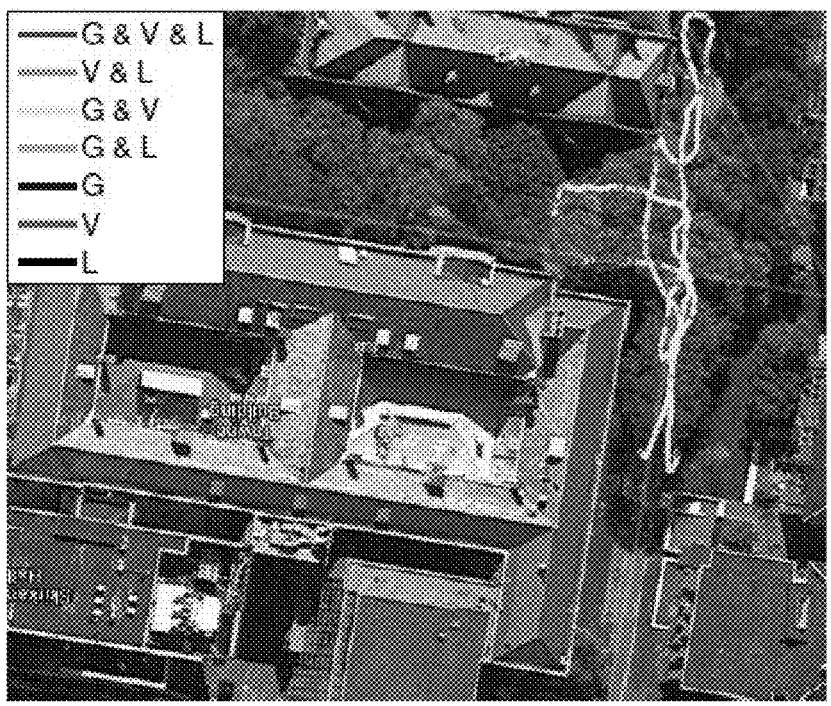
FIG. 10 depicts vehicle trajectory overlaid on a satellite map. The vehicle operates in a tree-lined campus environment, where there is high risk of GPS failure during operation.

We also conduct experiments in a tree-lined campus environment, as shown in FIG. 10. Autonomous flight in this environment is challenging due to nontrivial light condition changes as the vehicle moves in and out of tree shadows. The risk of GPS failure is also very high due to the trees above the vehicle. Laser-based odometry only works when close to buildings. The total trajectory length is 281 meters.

Figure 11A:
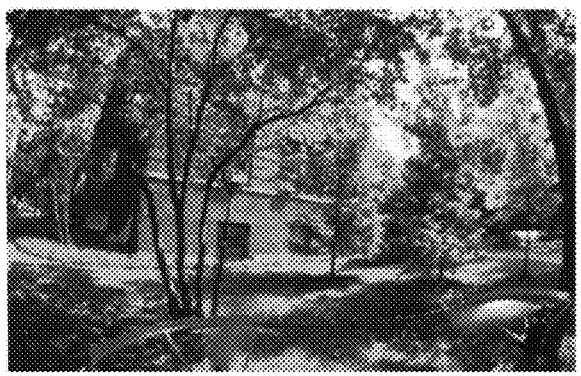
FIGS. 11A and 11B depict onboard (FIG. 11A) and external (FIG. 11B) camera images as the MAV autonomously flies through a tree-lined campus environment. Note the nontrivial light condition.
Figure 11B:

FIGS. 11A and 11B depict onboard (FIG. 11A) and external (FIG. 11B) camera images as the MAV autonomously flies through a tree-lined campus environment. Note the nontrivial light condition.

VII. Conclusion and Future Work

In this disclosure, we present a modular and extensible approach to integrate noisy measurements from multiple heterogeneous sensors that yield either absolute or relative observations at different and varying time intervals. Our approach generates high rate state estimates in real-time for autonomous flight. The proposed approach runs onboard our new 1.9 kg MAV platform equipped with multiple heterogeneous sensors. We demonstrate the robustness of our framework in large-scale, indoor and outdoor autonomous flight experiments that involves traversal through an industrial complex and a tree-lined campus.

In the near future, we would like to integrate higher level planning and situational awareness on our MAV platform to achieve fully autonomous operation across large-scale complex environments.

Figure 12:
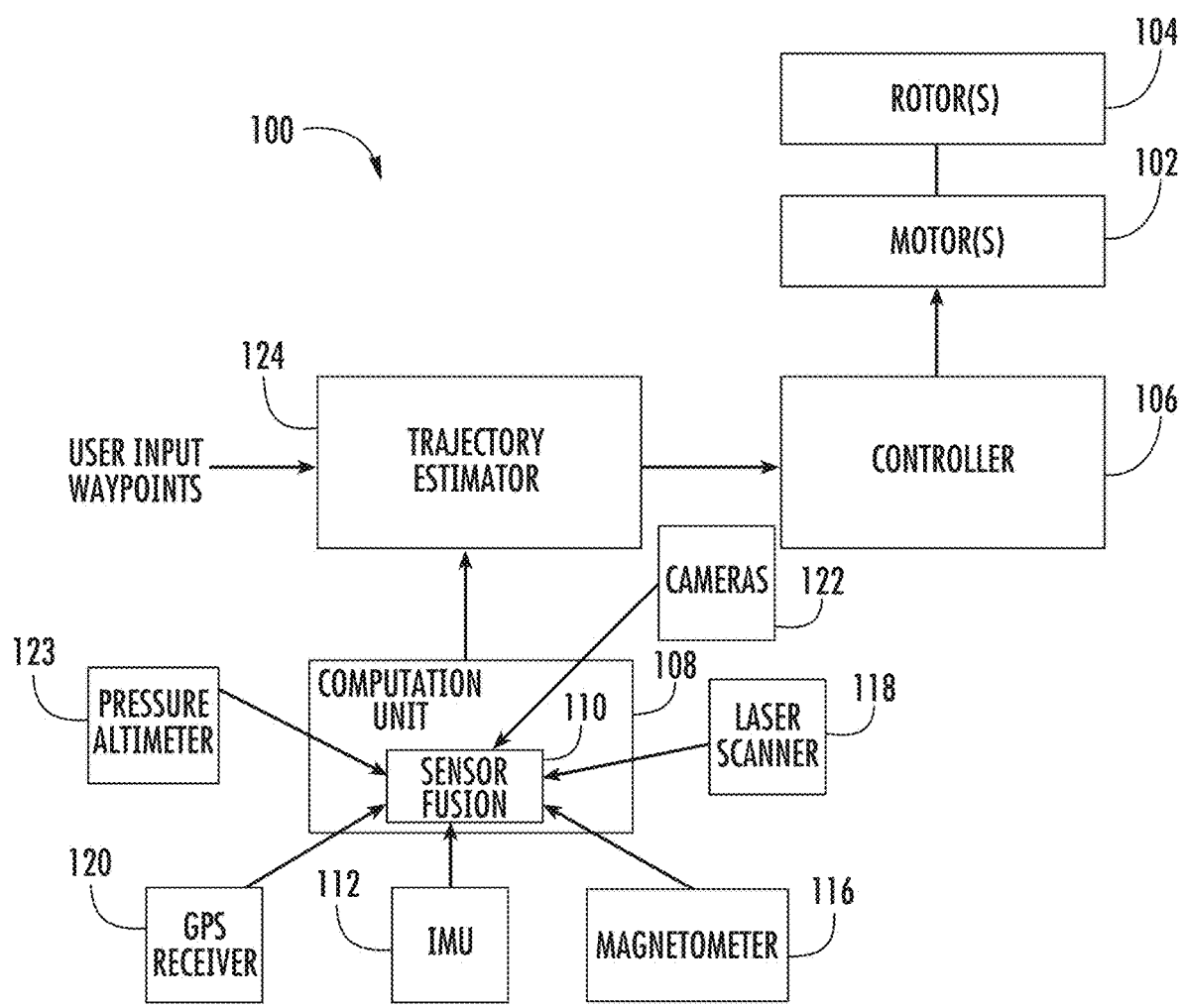
FIG. 12 is a block diagram of a rotorcraft MAV for performing multi-sensor fusion according to an embodiment of the subject matter described herein.

FIG. 12 is a block diagram illustrating an MAV for performing fusing measurements from sensors that produce both absolute and relative measurements according to an embodiment of the subject matter described herein. Referring to FIG. 12, the MAV 100 includes one or more motors 102 for controlling motion of the MAV using one or more rotors 104. As stated above, in the experiments described herein, the Pelican Quadro Rotor available from Ascending Technologies was used. However, other rotorcraft can be substituted without departing from the scope of the subject matter described herein. It also includes a controller 106 for controlling operation of the motors 102 based on sensor input. A computation unit 108 includes a sensor fusion module 110 that fuses the measurements from multiple sensors and produces an output signal to controller 106. In the illustrated example, sensor fusion module 110 receives input from IMU 112, pressure altimeter 114, magnetometer 116, laser scanner 118, GPS receiver 120, cameras 122, and pressure altimeter 123. Sensor fusion module 110 converts relative measurements, such as those produced by laser scanner 118 and cameras 122 to measurements that depend on augmented states as described above. The transformed measurements are combined using the Unscented Kalman Filter described above and output to controller 106. The signal provided as output to controller 106 serves as feedback to controller 106 for controlling position, velocity, and acceleration of MAV 100. Controller 106 also receives inputs from a trajectory estimator 124, which estimates the trajectory of MAV 100 needed to arrive at user-specific waypoints.

Figure 13:
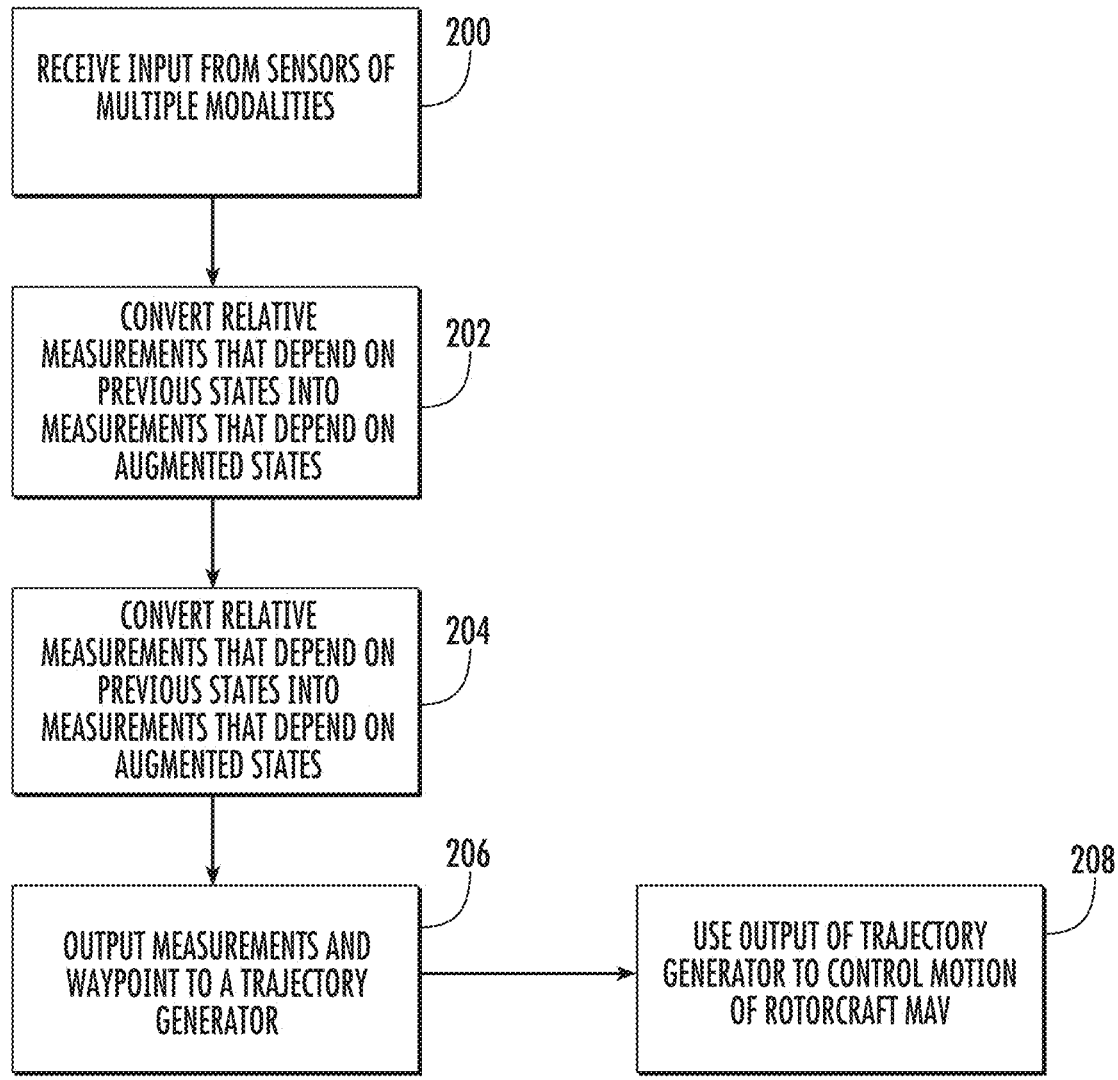
FIG. 13 is a flow chart illustrating an exemplary process for multi-sensor fusion controlling autonomous of a rotorcraft MAV according to an embodiment of the subject matter described herein.

FIG. 13 is a flow chart illustrating an exemplary process for controlling motion of a rotorcraft MAV using multi-sensor fusion according to an embodiment of the subject matter described herein. Referring to FIG. 13, in step 200, input is received from sensors of multiple different modalities. For example, computation unit 108 and sensor fusion module 110 may receive input from any one or more of the sensors illustrated in FIG. 12 from which output is available at a given time. In step 202, relative output measurements produced by some of the sensors that depend on previous states are converted into measurements that depend on augmented states. The process of performing such conversions is described above in Section IV(A). In step 204 measurements from the different sensors are combined and filtered. For example, the measurements may be combined using an Unscented Kalman Filter. In step 206, the combined measurements are output to a trajectory generator along with a waypoint input by a user. In step 208, the output of the trajectory generator is used to control motion of the rotorcraft MAV.

The disclosure of each of the following references is incorporated herein by reference in its entirety.

[1] S. J. Julier and J. K. Uhlmann, "A new extension of the kalman filter to nonlinear systems," in *Proc. of SPIE*, I. Kadar, Ed., vol. 3068, July 1997, pp. 182-193.

[2] R. V. D. Merwe, E. A. Wan, and S. I. Julier, "Sigma-point kalman filters for nonlinear estimation: Applications to integrated navigation," in *Proc. of AIAA Guidance, Navigation, and Controls Conf.*, Providence, R.I., August 2004.

[3] A. Bachrach, S. Prentice, R. He, and N. Roy, "RANGE-robust autonomous navigation in gps-denied environments," *J. Field Robotics*, vol. 28, no. 5, pp. 644 666, 2011.

[4] S. Shen, N. Michael, and V. Kumar, "Autonomous multi-floor indoor navigation with a computationally constrained MAV," in *Proc. of the IEEE Intl. Conf on Robot. and Autom.*, Shanghai, China, May 2011, pp. 20-25.

[5] S. Weiss, M. W. Achtelik, S. Lynen, M. Chli, and R. Siegwart, "Real-time onboard visual-inertial state estimation and self-calibration of mays in unknown environments," in *Proc. of the IEEE Intl. Conf on Robot. and Autom.*, Saint Paul, Minn., May 2012, pp. 957-964.

[6] D. G. Kottas, J. A. Hesch, S. L. Bowman, and S. I. Roumeliotis, "On the consistency of vision-aided inertial navigation," in *PrOC. of the Intl. Sym. on Exp. Robot.*, Quebec, Canada, June 2012.

[7] F. Fraundorfer, L. Heng, D. Honegger, G. H. Lee, L. Meier, P. Tanskanen, and M. Pollefeys, "Vision-based autonomous mapping and exploration using a quadrotor MAV," in *Proc. of the IEEE/RSJ Intl. Conf on bztell. Robots and Syst.*, Vilamoura, Algarve, Portugal, October 2012.

[8] K. Schmid, T. Tornio, E Ruess, H. Hirsclunuller, and M. Suppa, "Stereo vision based indoor/outdoor navigation for flying robots," in *Proc. of the IEEE/RSJ Intl. Cozzi: on Intell. Robots and Syst.*, Tokyo, Japan, November 2013.

[9] A. S. Huang, A. Bachrach, P. Henry, M. Krainin, D. Maturana, D. Fox, and N. Roy, "Visual odometry and mapping for autonomous flight using an RGB-D camera," in *Proc. of the Intl. Spit. of Robot. Research*, Flagstaff, Ariz., August 2011.

[10] Tomic, K. Schmid, P. Lutz, A. Domel, M. Kassecker, E. Mair, I. L. Grixa, F Ruess, M. Suppa, and D. Burschka, "Autonomous UAV: Research platform for indoor and outdoor urban search and rescue," *IEEE Robot. Autom. Mag.*, vol. 19, no. 3, pp. 46-56, 2012.

[11] S. I. Roumeliotis and J. W. Burdick, "Stochastic cloning: A generalized framework for processing relative state measurements," in *Proc. of the IEEE Intl. Conf on Robot. and Autom.*, Washington, D.C., May 2002, pp. 1788-1795.

[12] J. Carlson, "Mapping large urban environments with GPS-aided SLAM," Ph.D. dissertation, CMU, Pittsburgh, Pa., July 2010.

[13] D. Schleicher, L. M. Bergasa, M. Ocaa, R. Barea, and E. Lopez, "Real-time hierarchical GPS aided visual SLAM on urban environments," in *Proc. of the IEEE Intl. Conf. on Robot. and Autom.*, Kobe, Japan, May 2009, pp. 4381-4386.

[14] S. Shen, Y. Mulgaonkar, N. Michael, and V. Kumar, "Vision-based state estimation and trajectory control towards high-speed flight with a quadrotor," in *Proc. of Robot.: Sci. and Syst.*, Berlin, Germany, 2013.

[15] S. Lynen, M. W. Achtelik, S. Weiss, M. Chli, and R. Siegwart, "A robust and modular multi-sensor fusion approach applied to may navigation," in *Proc. of the IEEE/RSJ Intl. Conf. on Intell. Robots and Syst.*, Tokyo, Japan, November 2013.

[16] T. Lefebvre, H. Bruyninckx, and J. D. Schuller, "Comment on "a new method for the nonlinear transformation of means and covariances in filters and estimators"," *IEEE Trans. Autom. Control*, vol. 47, no. 8, pp. 1406-1409, 2002.

[17] D. C. Moore, A. S. Huang, M. Walter, and E. Olson, "Simultaneous local and global state estimation for robotic navigation," in *Proc. of the IEEE Intl. Conf. on Robot. and Autom.*, Kobe, Japan, May 2009, pp. 3794-3799.

[18] R. Kuemmerle, G. Grisetti, H. Strasdat, K. Konolige, and W. Burgard, "g2o: A general framework for graph optimizations," in *Proc. of the IEEE Intl. Conf. on Robot. and Autom.*, Shanghai, China, May 2011, pp. 3607-3613.

[19] R. Smith, M. Self, and P. Cheeseman, "Estimating uncertain spatial relationships in robotics," in *Proc. of the IEEE Intl. Conf on Robot. and Autom.*, vol. 4, Rayleigh, N.C., March 1987, p. 850.

[20] T. Lee, M. Leoky, and N. McClamroch, "Geometric tracking control of a quadrotor uav on SE(3)," in *Proc. of the Intl. Conf. on Decision and Control*, Atlanta, Ga., December 2010, pp. 5420-5425.

As stated above, an autonomous rotorcraft MAV according to an embodiment of the subject matter described herein may include a trajectory generator or estimator 124 for generating a trajectory plan for controlling a trajectory of a rotorcraft MAV during flight based on an estimated current state of the rotorcraft MAV and a waypoint input by a user. The following description illustrates trajectory planning that may be performed by trajectory generator or estimator 124 according to one embodiment of the subject matter described herein.

Vision-Based Autonomous Navigation in Complex Environments with a Quadrotor

The subject matter described herein includes present a system design that enables a light-weight quadrotor equipped with only forward-facing cameras and an inexpensive IMU to autonomously navigate and efficiently map complex environments. We focus on robust integration of the high rate onboard vision-based state estimation and control, the low rate onboard visual SLAM, and online planning and trajectory generation approaches. Stable tracking of smooth trajectories is achieved under challenging conditions such as sudden waypoint changes and large scale loop closure. The performance of the proposed system is demonstrated via experiments in complex indoor and outdoor environments.

I. Introduction

Quadrotor micro-aerial vehicles (MAVs) are ideal platforms for surveillance and search and rescue in confined indoor and outdoor environments due to their small size and superior mobility. In such missions, it is essential that the quadrotor be autonomous to minimize operator workload. In this work, we are interested in pursuing a light-weight, off-the-shelf quadrotor to autonomously navigate complex unknown indoor and outdoor environments using only onboard sensors with the critical control computations running in real-time onboard the robot.

The problem of autonomous aerial navigation has been studied extensively over the past few years. Early works [1]-[3] primarily rely on laser scanners as the main sensor and localize the vehicle in indoor environments with structural elements that do not vary greatly along the vertical direction (the 2.5 D assumption). Mechanized panning laser scanners that add considerable payload mass are used in [4, 5] for state estimation. Vision-based approaches, such as those in [6]-[8], rely on a downward-facing camera, a combination of stereo vision and a downward-facing optical flow sensor, and an RGB-D sensor, respectively, to achieve stable autonomous flight in indoor and/or outdoor environments. However, these approaches are unable to exploit the mobility and maneuverability of the quadrotor platform due to pragmatic concerns that arise from environment structure assumptions, reduced algorithm update rates, or the large vehicle size. Moreover, approaches that rely on downward-facing vision sensors [6, 7] often fail to perform robustly in environments with featureless floors or at low altitudes.

At the other end of the spectrum, there are many successful reactive navigation approaches that do not rely on metric state estimation [9, 10]. Although these approaches enable autonomous flight with low computation power, they fundamentally limit the flight capabilities of the MAV when operating in complex environments.

We pursue an autonomous navigation approach that enables the vehicle to estimate its state in an unknown and unstructured environment, map the environment, plan in the map, and autonomously control along trajectories developed from this plan. Online obstacle detection and replanning permit operation in static and dynamic environments with average flight speeds of more than 1 m/s. At such speeds, a low-latency state estimation, online smooth trajectory generation, and responsive vehicle control become necessary due to the agility of the platform. A challenge that arises in pursuit of this goal is the need to ensure that the estimated pose remains smooth and consistent, even during loop closures resulting from simultaneous localization and mapping. Traditionally, loop closure corrections are fused directly into the high rate onboard state estimator. This causes discontinuities in the estimated state, which, especially during rapid maneuvers, can lead to catastrophic crashes of the quadrotor.

In this work, we address these requirements by proposing a system architecture that employs two forward-facing cameras as the primary sensors, and a novel methodology that maintains estimation smoothness and control stability during replanning and loop closure, which in turn enables efficient autonomous navigation in complex environments.

II. System Design and Methodology

Figure 15:
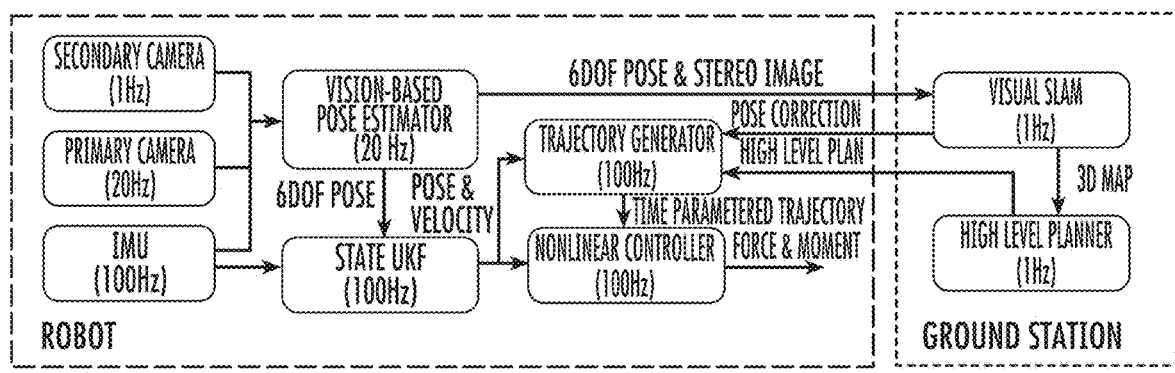
FIG. 15 illustrates a system architecture with update rates and information flow between modules marked.

We begin by providing an overview of the system architecture and methodology, and the hardware and software components required for our design. Detailed discussion of the major components are given in subsequent sections following the logical flow of the system block diagram (FIG. 15).

A. Hardware Platform

Figure 14:
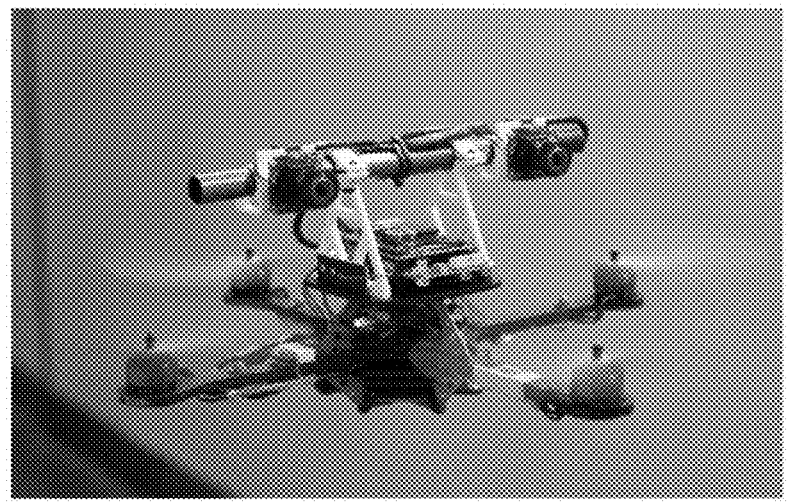
FIG. 14 illustrates an experimental platform with limited onboard computation (Intel Atom 1.6 GHz processor) and sensing (two cameras with fisheye lenses and an off-the-shelf inexpensive IMU). The platform mass is 740 g.

The experimental platform (FIG. 14) is based on the Hummingbird quadrotor from Ascending Technologies (see http:/www.asctec/de). This off-the-shelf platform comes with an AutoPilot board that is equipped with an inexpensive IMU and a user-programmable ARM7 microcontroller. The high level computer onboard includes an Intel Atom 1.6 GHz processor and 1 GB RAM. Communication between the onboard computer and a ground station is via 802.11n wireless network. The only new additions to the platform are two grayscale mvBlueFOX-MLC200w cameras with hardware HDR. All cameras are equipped with fisheye lenses. The synchronization between cameras and IMU is ensured via hardware triggering. The total weight of the platform is 740 g.

B. Software Architecture and Methodology

The software architecture is shown in FIG. 15. This architecture allows us to divide the computations between the onboard low and high level processors and the offboard ground station. On the onboard high level computer, a vision-based estimator provides 6-DOF pose estimates at 20 Hz. We employ an unscented Kalman filter (UKF) to fuse pose estimates with IMU measurements and generate 100 Hz state estimates that are directly used as the feedback for the nonlinear tracking controller. On the ground station, a stereo-based visual SLAM module generates a 3D voxel grid map for the high level planner. The SLAM module also provides global pose correction. However, we do not directly fuse this pose correction with the vision-based state estimate since it may cause significant pose discontinuities in the event of large scale loop closures. Instead, we transform the waypoints using the pose correction such that, if the vehicle follows these transformed waypoints, it is still able to reach the global goal. We further develop a trajectory generator that runs onboard the high level computer at 100 Hz to convert the desired waypoints into smooth polynomial trajectories.

III. Visual-Inertial (VINS) State Estimation

A. Vision-Based Pose Estimation

We use a modification of our earlier work [11] to estimate the 6-DOF pose of the vehicle. Note that although we equip the platform with two cameras, we do not perform traditional stereo-based state estimation. In fact, we set one camera that captures images at 20 Hz as the primary camera, while the other camera is configured to capture images at 1 Hz. Because we don't perform high rate disparity computations, the required computational power is reduced. However, the stereo geometry allows us to estimate metric information preserving the scale of the local map and the pose estimates.

I) Monocular-Based Pose Estimation:

For images captured by the primary fisheye camera, we detect FAST corners [12] and track them using the KLT tracker [13]. Note that due to the high frame rate of the primary camera, we are able to perform feature tracking directly on the distorted fisheye images, avoiding additional computation overhead on image undistortion. We utilize the incremental rotation estimate from short term integration of the gyroscope measurement and perform 2-point RANSAC to reject tracking outliers. We propose a decoupled orientation and position estimation scheme in order to make use of distant features that are not yet triangulated. The orientation of the robot $R_j$ is estimated via epipolar constraints with look-back history to minimize drifting. Assuming the existence of a perfect 3D local map, which consists of triangulated 3D features $p_i$, $i \in I$, the position of the robot $r_j$ can be found efficiently by solving the following linear system:

$$\left( \sum_{i \in I} \frac{\mathbb{I}_3 - u_{ij}^r u_{ij}^{rT}}{d_i} \right) r_j = \sum_{i \in I} \frac{\mathbb{I}_3 - u_{ij}^r u_{ij}^{rT}}{d_i} p_i \quad (1)$$

where $u_{ij}$ is the unit length feature observation vector; $u_{ij}^r \triangleq R_j u_{ij}$; and $d_i = \|r_{j-1} - p_i\|$.

Once the 6-DOF pose is found, the location of the feature $p_i$ can be found by solving the following linear system:

$$A_{ij} p_i = b_{ij} \tag{2}$$

where $A_{ij}$ and $b_{ij}$ represent all observations of the $i^{th}$ feature up to the $j^{th}$ frame. This is a memoryless problem, therefore the complexity of feature triangulation is constant regardless of the number of observations of that particular feature.

2) Stereo-Based Scale Recovery:

The pose estimation approach described above suffers from scale drift due to the accumulated error in the monocular-based triangulation. Every instant stereo measurement is used for scale drift compensation. Let $K$ denote the set of features seen by both cameras. We can compute the difference of the average scene depth as:

$$\gamma = \frac{1}{|K|} \sum_{k \in K} \frac{\|p_k - r_j\|}{\|p_k^s\|} \tag{3}$$

where $p_i^s$ is the 3D feature location obtained solely via stereo triangulation. We can then compensate for the drifting of scale by modifying $b_{ij}$ as (4) and solve (2) again.

$$b_{ij}^+ = \frac{1}{\gamma} b_{ij} - \frac{1}{\gamma} A_{ij} r_j + A_{ij} r_j \tag{4}$$

B. UKF-Based Sensor Fusion

The 20 Hz pose estimate from the vision system alone is not sufficient to control the robot. An UKF with delayed measurement compensation is used to estimate the pose and velocity of the robot at 100 Hz [14]. The system state is defined as:

$$x = [r, \dot{r}, q, a_b]^T \tag{5}$$

where $r$ is the 3D position of the robot; $q$ is the quaternion representation the 3D orientation of the robot; and $a_b$ is the bias of the accelerometer measurement in the body frame. We use a conventional IMU-based process model to propagate the system state, and a linear measurement model which consists of the 6-DOF pose for state correction.

C. Performance of the Visual-Inertial State Estimator

Figure 16:
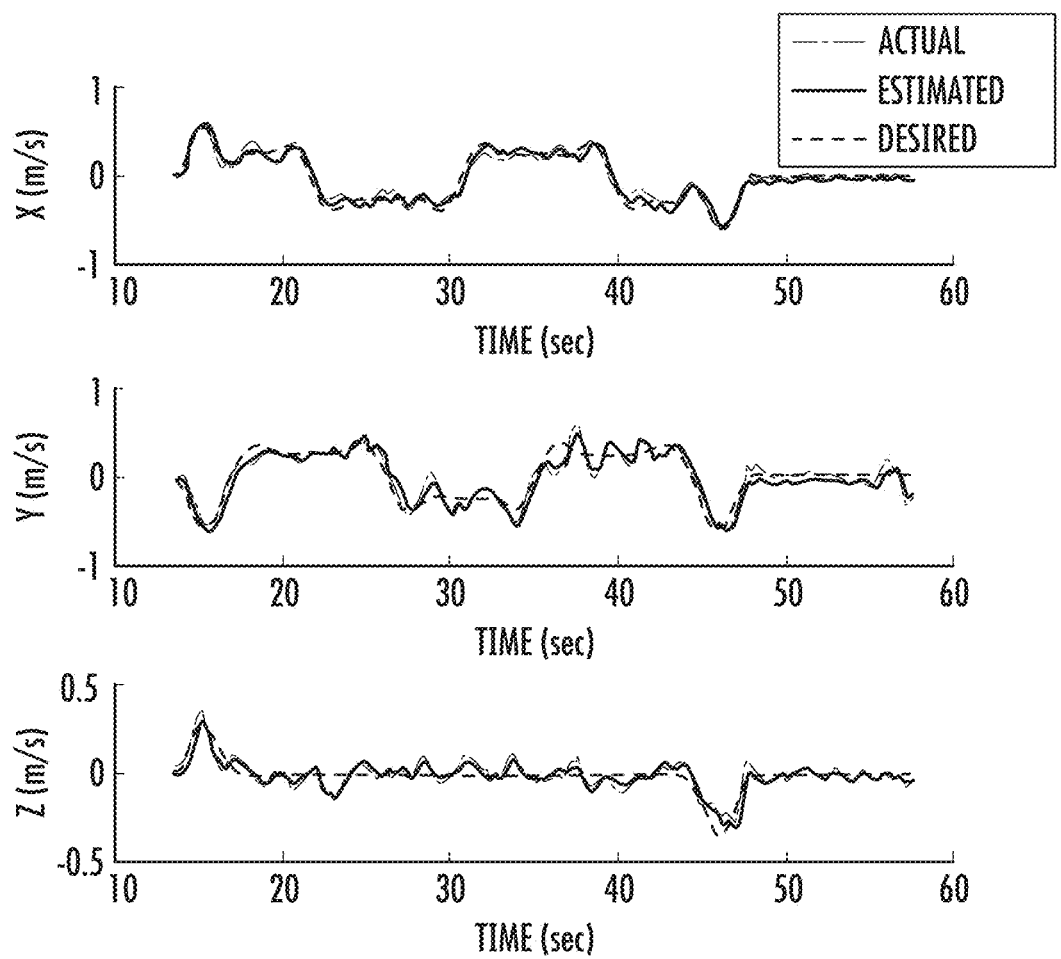
FIG. 16 illustrates the performance of body frame velocity estimation during autonomous tracking of the trajectory presented in Sect. VIII-A.
Figure 17A:
FIGS. 17A-17D illustrate the effects on feature tracking performance due to fast translation (FIGS. 17A-17B) and fast rotation (FIGS. 17C-17D). The number of tracked features significantly decrease after rotation.
Figure 17B:
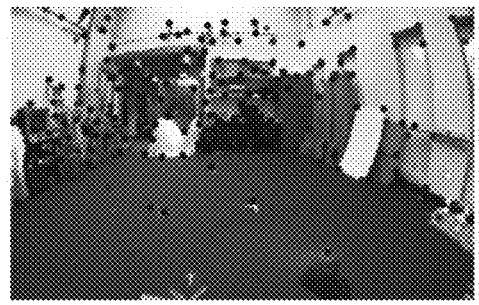
Figure 17C:
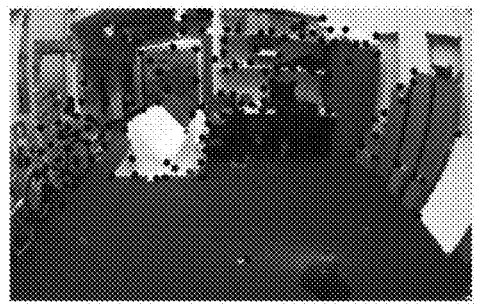
Figure 17D:
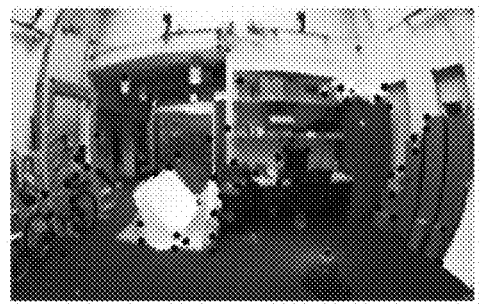

FIG. 16 shows the comparison of the performance of the VINS estimator against the ground truth from the Vicon motion capture system[2] during autonomous tracking of a predefined trajectory (Sect. VIII-A). The onboard velocity estimates compare well with the Vicon estimates (all transformed to the body frame) with standard deviation of $\{\sigma_{v_x}, \sigma_{v_y}, \sigma_{v_z}\} = \{0.0500, 0.0706, 0.0309\}$ (m/s). However, the lack of global bundle adjustment of the VINS estimator results in long term drift in the estimated pose due to recursive formulation. We therefore introduce an odometry frame, $(r_j^O, R_j^O)$ to represent such drifting behavior.

IV. Visual Slam

We implement a visual SLAM module to eliminate the drift in the VINS system. Visual SLAM is a widely studied area. In small workspaces, approaches that use recursive filtering [15] or parallel tracking and mapping techniques [16] yield accurate results. Large scale mapping with monocular [17] or stereo [18] cameras are achieved using pose graph-based formulations. In our system, due to the limited onboard computation resources, limited wireless transmission bandwidth, and the accuracy of the onboard estimator, a high rate visual SLAM is both unnecessary and infeasible. Therefore, our visual SLAM module runs offboard with a maximum rate of 1 Hz. A pose graph-based SLAM backend, together with a front-end that utilize SURF features [19] for wide baseline loop closure detection, yield robust performance at such low rates. We sparsely sample the estimated robot trajectory to generate nodes for the pose graph. For each node, we compute sparse 3D points by detecting and matching SURF features between the stereo images. Dense disparity images and dense point clouds are also computed.

We detect loop closures by checking nodes that fall inside the uncertainty ellipsoid of the current node. We check a constant number of nodes, starting from the earliest candidate, for possible loop closures. SURF features are used to test the similarity between two scenes. We compute the relative transform between the current node and the loop closure candidate using RANSAC PnP [20]. A rigidity test, proposed in (Sect. 3.4, [21]), is performed to verify the geometric consistency of the loop closure transform. Candidate transforms that pass the geometric verification are added to the pose graph. Finally, we use the iSAM library for pose graph optimization [22]. Once an optimized pose graph is found, we can construct a 3D voxel grid map by projecting the dense point cloud to the global frame. This map is used for the high level planning (Sect. V) and to enable the human operator to monitor the progress of the experiment. The optimized pose represents an estimate in the world frame and is denoted by $(r_j^W, R_j^W)$.

The pose correction from the visual SLAM $d_j^{WO}$, which serves as the transform between the odometry frame and the world frame, is formulated such that:

$$(r_j^W, R|_j^W) = d_j^{WO} \oplus (r_j^O, R_j^O) \tag{6}$$

where $\oplus$ is the pose update function defined in [23]. In contrast to traditional approaches, we do not use $(r_j^W, R_j^W)$ as a global pose measurement for correcting the drift in the VINS system. Instead, we feed $d_j^{WO}$, into the trajectory generator (Sect. VI) and compute trajectories that are guaranteed to be smooth even if there are large discontinuities in the visual-SLAM pose estimate (i.e. $\|d_j^{WO} \ominus d_{j-1}^{WO}\|$ is large) due to loop closures. This is the major departure of our system from existing approaches and it is the key to enable high-speed autonomous navigation in complex environments. Further details are provided in Sect. VI.

V. High Level Planning

We employ a two-stage planning approach. On a higher level, given the user-specified waypoints in the world frame, and treating the quadrotor as a cylinder, a high level path that connects the current robot position and the desired goal, which consists a sequence of desired 3D positions and yaw angles, is generated using the RRT* [24] as implemented in the Open Motion Planning Library (OMPL) [25]. The resulting path is simplified to a minimum number of K waypoints $g_k^W$ and is sent to the trajectory generator (Sect VI) for further refinement. The path is checked for possible collisions at the same frequency as the map update (1 Hz, Sect IV). Although the high level planner only requires moderate computational resources, we run it offboard as all information required for high level planning comes from the offboard visual SLAM module. We also allow the user to bypass the planner and explicitly set a sequence of waypoints.

VI. Trajectory Generation

We first transform all waypoints from the high level planner into the odometry frame using the latest pose correction from the visual SLAM (6):

$$g_k^O = \ominus d_j^{WO} \oplus g_k^W. \quad (7)$$

If the robot flies through all transformed waypoints using the state estimate in the odometry frame for feedback control, it will also fly through the same sets of waypoints in the world frame. Moreover, it there are large scale loop closures (i.e. large changes in $d_j^{WO}$), the set of waypoints that the robot is heading towards will change significantly. However, if we are able to regenerate smooth trajectories with initial conditions equal to the current state of the robot, the transition between trajectories will be smooth and no special handling is needed within the onboard state estimator and the controller.

We wish to ensure that the quadrotor smoothly passes through all waypoints, while at the same time maintaining a reliable state estimate. A crucial condition that determines the quality of the vision-based estimate is the tracking performance. With our fisheye cameras setup, it can be seen from FIGS. 17A-17D that fast translation has little effect on the tracking performance due to the large field of view. However, fast rotation can blur the image easily, causing the failure of the KLT tracker. This observation motivates us to design trajectories that minimize the angular velocities in roll and pitch.

By differentiating the equation of motion of a quadrotor [26], it can be seen that the angular velocity of the body frame is affinely related to the jerk, the derivative of the linear acceleration. As such, we generate trajectories that minimize the jerk of the quadrotor in horizontal directions.

For the vertical direction, we wish to minimize the RPM changes of the motors, which again correspond to the jerk. Intermediate waypoints are added shortly before and after a waypoint if the angle between the two line segments that connect this waypoint exceeds a threshold in order to avoid large deviations from the high level path. We utilize a polynomial trajectory generation algorithm [27] that runs onboard the robot with a runtime on the order of 10 ms. Optimal trajectories can be found by solving the following unconstrained quadratic programming:

$$\min_y y^T Q y \quad (8)$$

Where y is a collection of desired derivative values at each waypoint, which can be either free or fixed. We fix the position, velocity, acceleration, at the first waypoint to be current state of the robot in order to maintain smooth trajectories during replanning and loop closures. The velocity and acceleration are set to be zero for the last waypoint. For all other waypoints, only position is fixed and the trajectory generator will provides the velocity and acceleration profile. The coefficients of the polynomial trajectories s can be found via a linear mapping s=My.

A limitation of the above trajectory generation approach is the necessity of predefining the travel time between waypoints. Due to computational constraints, we do not perform any iterative time optimization [27, 28] to find the optimal segment time, but rather use a heuristic that approximates the segment time as a linear trajectory that always accelerates from and decelerates to zero speed with a constant acceleration at the beginning and end of a segment, and maintains constant velocity in the middle of a segment. This simple heuristic can help avoid excessive accelerations during short segments, and is a reasonable time approximation for long segments.

Figures 18A, 18B:
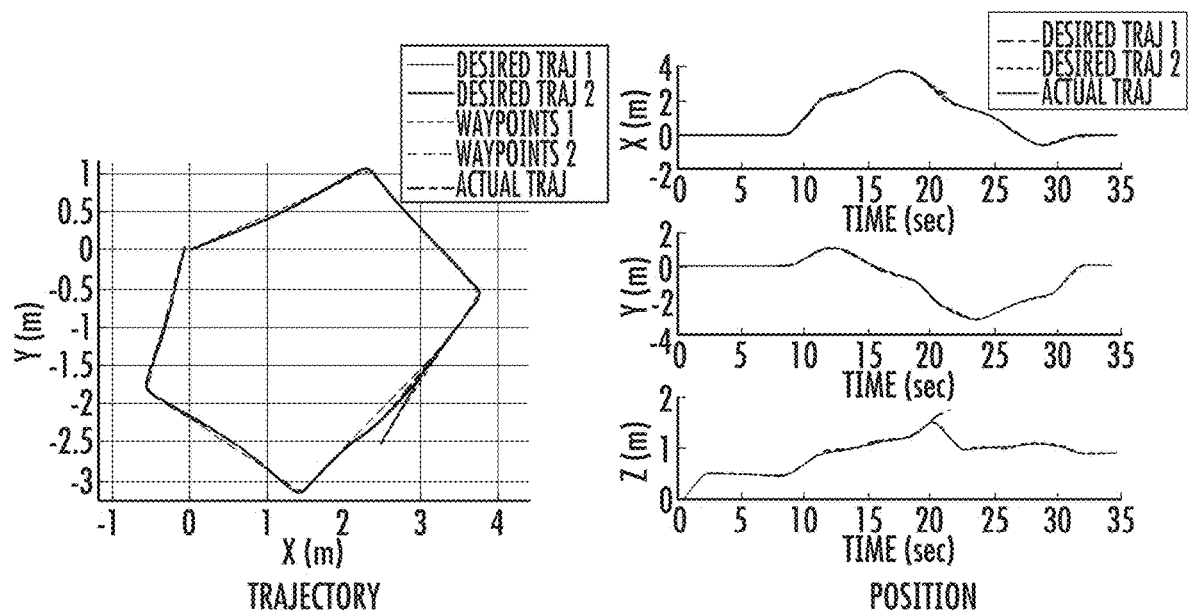
FIGS. 18A and 18B illustrate that a simulated quadrotor tracks a smooth trajectory generated from a sequence of waypoints. Trajectory regeneration takes place after a change of waypoints at 20 s.

FIGS. 18A and 18B show in simulation a quadrotor tracking a smooth trajectory generated from a sequence of waypoints. A change of waypoints and trajectory regeneration take place at 20 s. The regenerated trajectory smoothly connects to the initial trajectory and the quadrotor is able to smoothly switch waypoints.

VII. Control

A. Position Tracking Controller

For this work, we choose to use a position tracking controller with a nonlinear error metric [29] due to its superior performance in highly dynamical motions that involve large angle changes and significant accelerations. The 100 Hz state estimate from the VINS system (Sect. III) is used directly as the feedback for the controller. In our implementation, the attitude controller runs at 1 kHz on the ARM processor on the robot's AutoPilot board, while the position tracking control operates at 100 Hz on the Atom processor.

B. Hybrid-System Controller

Figure 19:
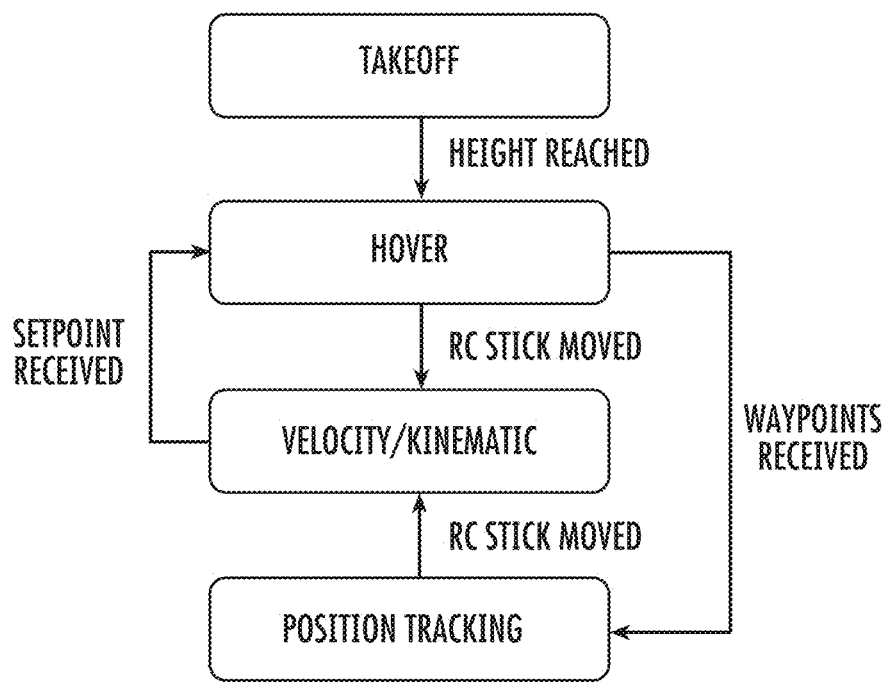
FIG. 19 illustrates a finite state machine-based approach to MAV navigation that enables the operator to interact with the vehicle during experiments.

Although our goal is to develop a fully autonomous vehicle, at some point during the experiment, the human operator may wish to have simple, but direct control of the vehicle. As such, we developed a finite state machine-based hybrid-system controller (FIG. 19) to allow human-robot interaction. There are four modes in this controller, the controller presented in Sect. VI.A operates in the position mode. At any time, the operator is able to send inputs via a remote control. These commands are interpreted by the vehicle as kinematic velocity commands (where no commands result in hover state). We experimentally tested that the velocity control mode is easy to use in the sense that an untrained operator is able to control the vehicle without direct line-of-sight using only the 1 Hz images and the global 3D map. The hover mode serves as an idle state, where the vehicle is waiting for commands from the operator.

VIII. Experimental Results

We present three representative experiments to demonstrate the performance of the proposed system. The first experiment demonstrates the ability of the proposed system to maintain globally consistent tracking. We provide a comparison with ground truth to quantify the performance. In the second experiment, the robot navigates an indoor environment with a large loop (approximately 190 m) and completes the loop within one battery charge (less than 5 minutes of flight time). Finally, we present an outdoor navigation experiment that emphasizes the robustness of the proposed system against environment changes and strong wind disturbance.

A. Evaluation of System Performance with Ground Truth Comparison

Figure 20A:
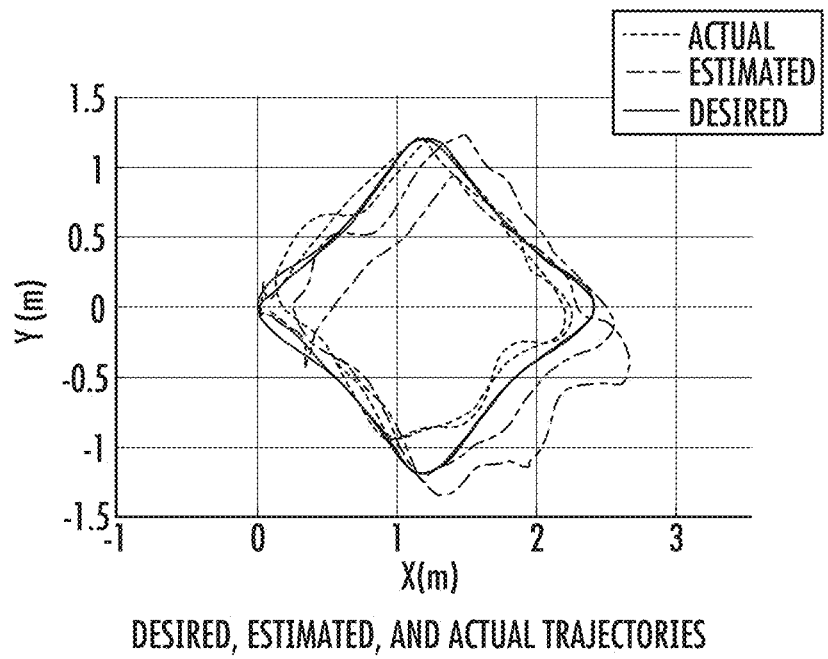
FIGS. 20A and 20B illustrate desired, estimated and actual trajectories when the robot is commanded to follow a smooth trajectory generated from a rectangle pattern.
Figure 20B:
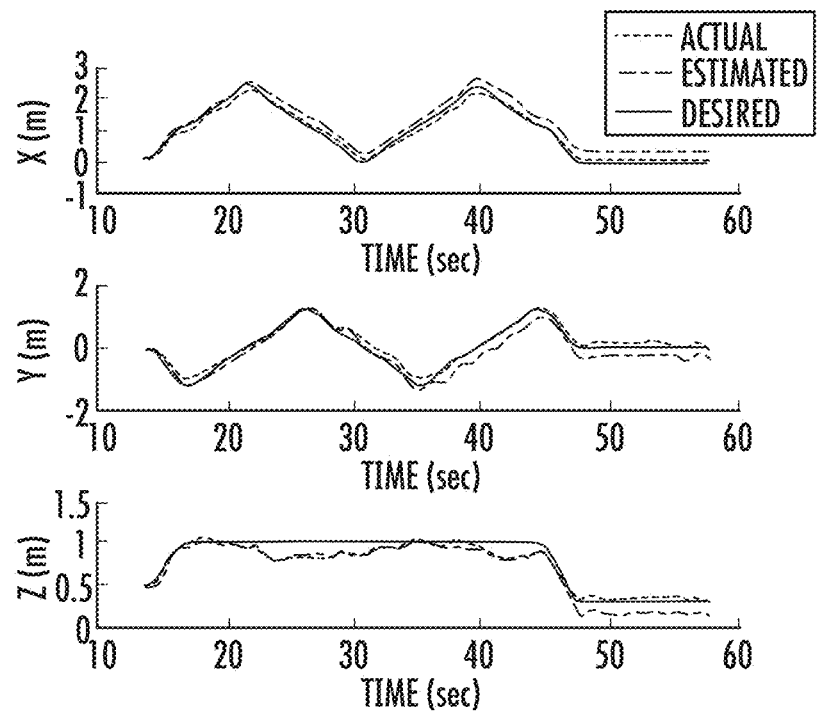

In this experiment, the robot autonomously follows a smooth trajectory generated from a rectangle pattern at approximately 1 m/s. The ground truth from Vicon is used to quantify the global tracking performance. As seen from FIG. 20A and FIG. 20B, there is slow position drift in the VINS state estimate. However, global corrections from the offboard visual SLAM results in a globally consistent operation. Note that the robot is controlled using the VINS state estimate, although global loop closure is clearly being merged into the system. Due to the correction from the visual SLAM, the desired smooth trajectory in the odometry frame regenerates and changes over time. It can be seen from FIG. 20A that the actual position of the robot converges to the desired position, with a standard deviation of $\{\sigma_x, \sigma_y, \sigma_z\}=\{0.1108, 0.1186, 0.0834\}$ (m), indicating global consistent tracking.

B. Navigation of Indoor Environments with Large Loops

Figure 21A:
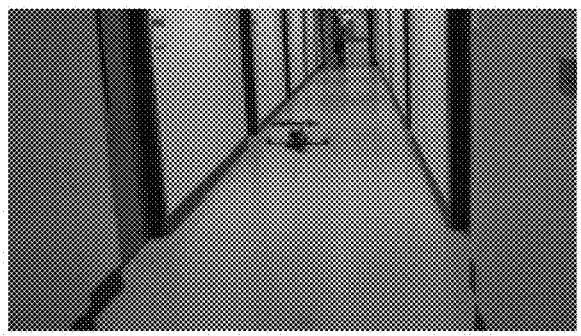
FIG. 21A is a snapshot image of the indoor environment and FIG. 21B is the image captured by the onboard camera. Note that the floor is featureless, which can pose a challenge to approaches that rely on downward facing cameras.
Figure 21B:
Figures 22A, 22B:
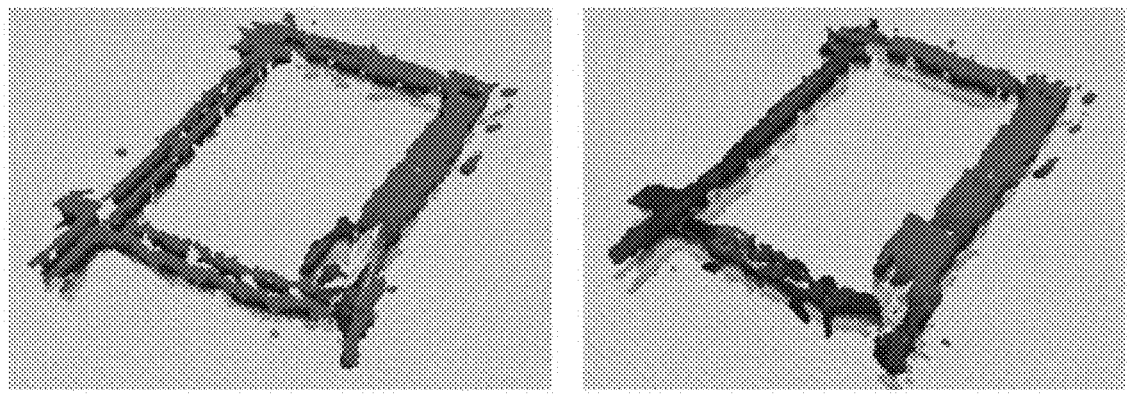
FIGS. 22A-22C illustrate maps and estimated positions during the indoor navigation experiment. Note the nontrivial discontinuities in the pose estimates obtained via SLAM after the loop closure (FIG. 22C)
Figure 22C:
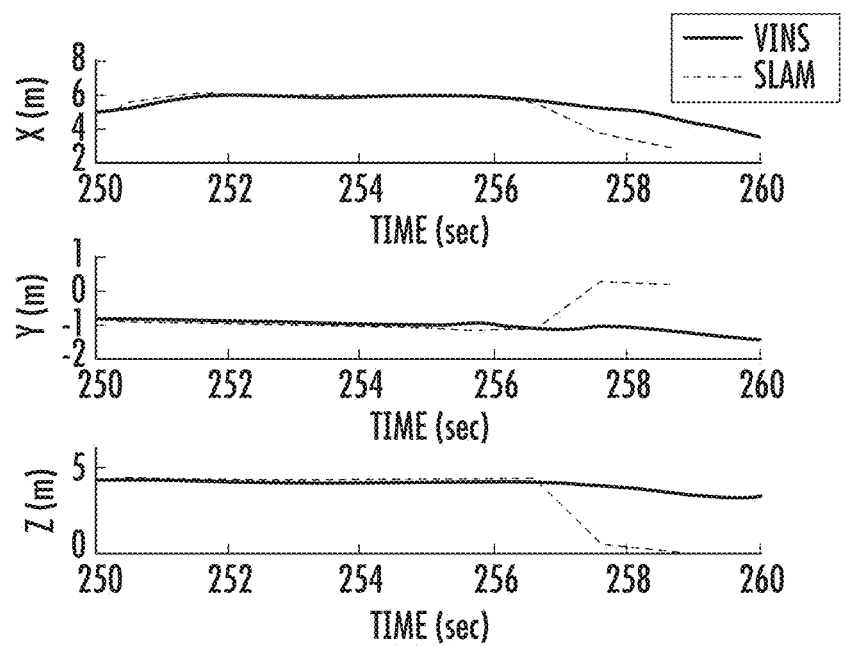

We now consider a case where the robot autonomously navigates through a large-scale environment with loops. Due to the size of the loop (approximately 190 m), and the short battery life cycle (less than 5 min), we must achieve high-speed navigation in order to complete the task. This environment poses significant challenges to approaches that uses downward facing cameras [6, 7] due to the featureless floor (FIGS. 21A and 21B). However, a reliable state estimate is obtained by the proposed system, and the robot successfully completes the experiment with a maximum speed of over 1.5 m/s and an average speed of 1 m/s. A large-scale loop closure is detected at 257 s (FIG. 22C), during which both the SLAM pose and the 3D map change significantly (FIGS. 22A-22B). However, as seen in FIG. 22C, the state estimate that is used for feedback control of the robot remains smooth throughout the experiment and the robot is able to return to the global origin by following the transformed waypoints in the odometry frame (Sect. VI).

C. Autonomous Navigation in Complex Outdoor Environments

Figure 23:
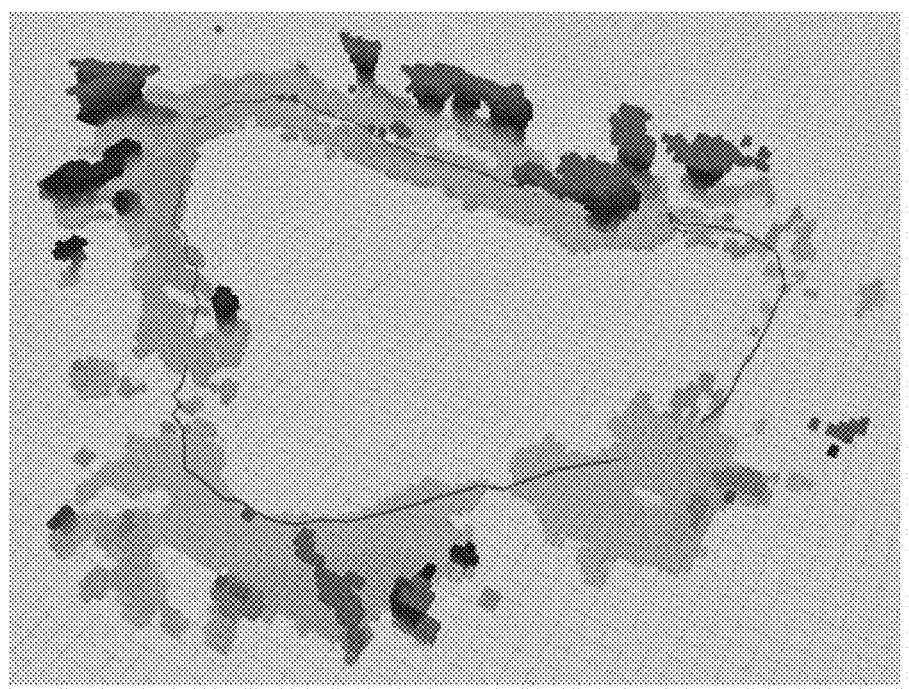
FIG. 23 illustrates a final 3D map and trajectory of the outdoor experiment after closing the loop.
Figure 24A:
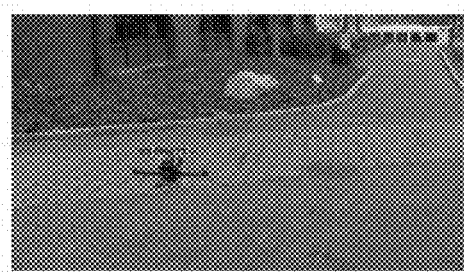
FIGS. 24A-24D contain images of autonomous navigation in a complex outdoor environment. Images from both the external video camera and the onboard camera are shown. Videos of the experiments are available at http://mrsl.grasp.upenn.edu/shaojie/IROS2013.mov.
Figure 24B:
Figure 24C:
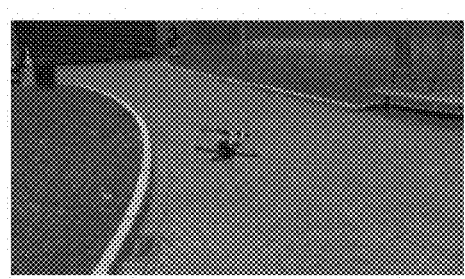
Figure 24D:

This experiment demonstrates the performance of the proposed system in outdoor environments. The experiment is conducted in a typical winter day at Philadelphia, Pa., where the wind speed goes up to 20 km/hr. The total travel distance is approximately 170 m with a total duration of 166 s (FIG. 23). Snapshots from the video camera and images captured by the onboard camera are shown in FIGS. 24A-24D. Note that the outdoor environment is largely unstructured, consisting of trees and vegetation, demonstrating the ability of the system to also operate in unstructured environments.

IX. Conclusion and Future Work

As described herein, we propose a system design that enables globally consistent autonomous navigation in complex environments with a light weight, off-the-shelf quadrotor using only onboard cameras and an IMU as sensors. We address the issue of maintaining smooth trajectory tracking during challenging conditions such as sudden waypoint changes and loop closure. Online experimental results in both indoor and outdoor environments are presented to demonstrate the performance of the proposed system.

An integrated laser- and/or GPS-based state estimation approach may be incorporated into our current system to extend the operational environments and enhance the system robustness.

The disclosures of each of the following references in incorporated herein by reference in its entirety.

REFERENCES

[1]. A. Bachrach, S. Prentice, R. He, and N, Roy, "RANGE-robust autonomous navigation in gps-denied environments," *J. Field Robotics*, vol. 28, no. 5, pp, 644-666, 2011.

[2]. S. Grzonka, G. Grisetti, and W. Burgard, "A fully autonomous indoor quadrotor," *IEEE Trans. Robot.*, vol. PP, no. 99, pp. 1-11, 2011.

[3]. S. Shen, N. Michael, and V. Kumar, "Autonomous multi-floor indoor navigation with a computationally constrained MAV," in *Proc. of the IEEE Intl. Conf on Robot. and Autom.*, Shanghai, China, May 2011, pp. 20-25.

[4]. S. Scherer, J. Rehder, S. Achar, H. Cover, A, Chambers, S. Nuske, and S. Singh, "River mapping from a flying robot: state estimation, river detection, and obstacle mapping," *Auton. Robots*, vol. 33, no. 1-2, pp. 189-214, August 2012.

[5]. A. Kushleyev, B. MacAllister, and M. Likhachev, "Planning for landing site selection in the aerial supply delivery," in *Proc. of the IEEE/RSJ Intl. Conf on Intell. Robots and Syst.*, San Francisco, Calif., September 2011, pp, 1146-1153.

[6]. S. Weiss, M. W. Achtelik, S. Lynen, M. Chli, and R. Siegwart, "Real-time onboard visual-inertial state estimation and self-calibration of mavs in unknown environments," in *Proc. of the IEEE Intl. Conf. on Robot. and Autom.*, Saint Paul, Minn., May 2012, pp. 957-964.

[7]. F. Fraundorfer, L. Heng, D. Honegger, G. H. Lee, L. Meier, P. Tanskanen, and M. Pollefeys, "Vision-based autonomous mapping and exploration using a quadrotor MAV," in *Proc. of the IEEE/RSJ Intl. Conf on Intell. Robots and Syst.*, Vilamoura, Algarve, Portugal, October 2012.

[8]. A. S. Huang, A. Bachrach, P. Henry, M. Krainin, D. Maturana, D. Fox, and N. Roy, "Visual odometry and mapping for autonomous flight using an RGB-D camera," in *Proc. of the Intl. Sym, of Robot. Research*, Flagstaff, Ariz., August 2011,

[9]. C. Bills, J. Chen, and A. Saxena, "Autonomous MAV flight in indoor environments using single image perspective cues," in *Proc. of the IEEE Intl. Conf. on Robot, and Autom*, Shanghai, China, May 2011, pp. 5776-5783.

[10]. G. de Croon, C. D. Wagterb, B. Remesb, and R. Ruijsinkb, "Sub-sampling: Real-time vision for micro air vehicles," *Robot. and Autom. Syst.*, vol. 60, no. 2, pp. 167-181, February, 2012.

[11]. S. Shen, Y. Mulgaonlcar, N. Michael, and V. Kumar, "Vision-based state estimation for autonomous rotorcraft MAVs in complex environments," in *Proc. of the IEEE Intl. Conf on Robot. and Autom*, Karlsruhe, Germany, May 2013, To appear.

[12]. E. Rosten and T. Drummond, "Machine learning for high-speed corner detection," in *Proc. of the European Conf on Computer Vision*, Graz, Austria, May 2006.

[13]. B. D. Lucas and T. Kanade, "An iterative image registration technique with an application to stereo vision," in *Proc. of the Intl. Joint Conf on Artificial Intelligence*, Vancouver, Canada, August 1981, pp. 24-28.

[14]. R. V. D. Merwe, E. A. Wan, and S. I. Julier, "Sigma-point Kalman filters for nonlinear estimation: Applications to integrated navigation," in *Proc. of AIAA Guidance, Navigation, and Controls Conf*, Providence, R.I., August 2004.

[15]. J. Civera, A. J. Davison, and J. Montiel, "Inverse depth parameterization for monocular SLAM," *IEEE Trans. Robot*, vol. 24, no, 5, pp. 932-945, October 2008.

[16]. G. Klein and D. Murray, "Parallel tracking and mapping for small AR workspaces," in *Proc. Sixth IEEE and ACM International Symposium on Mixed and Augmented Reality (ISMAR'07)*, Nara, Japan, November 2007.

[17]. H. Strasdat, J. M. M. Montiel, and A. J. Davison, "Scale drift-aware large scale monocular SLAM," in *Proc. of Robot.: Sci. and Syst.*, Zaragoza, Spain, June 2010.

[18]. C. Mei, G. Sibley, M. Cummins, P. Newman, and I. Reid, "RSLAM: A system for large-scale mapping in constant-time using stereo," *Intl J. of Computer Vision*, pp. 1-17, June 2010.

[19]. H. Bay, T. Tuytelaars, and L. V. Gool, "SURF: Speeded up robust features," in *Proc. of the European Conf on Computer Vision*, Graz, Austria, May 2006.

[20]. F. Moreno-Noguer, V. Lepetit, and P. Fua, "Accurate non-iterative 0(n) solution to the PnP problem," in *Proc. of the IEEE Intl. Conf on Computer Vision*, Rio de Janeiro, Brazil, October 2007.

[21]. E. B. Olson, "Robust and efficient robotic mapping," Ph.D. dissertation, MIT, Cambridge, Mass., June 2008.

[22]. M. Kaess, A. Ranganathan, and F. Dellaert, "iSAM: Incremental smoothing and mapping," *IEEE Trans, Robot.*, vol. 24, no. 6, pp. 1365-1378, December 2008.

[23]. R. Smith, M. Self, and P. Cheeseman, "Estimating uncertain spatial relationships in robotics," in *Proc. of the IEEE Intl. Conf on Robot. and Autom.*, Rayleigh, N.C., March, 1987, p. 850.

[24]. S. Karaman and E. Frazzoli, "Incremental sampling-based algorithms for optimal motion planning," in *Proc. of Robot: Sci, and Syst.*, Zaragoza, Spain, June 2010.

[25]. I. A. Sucan, M. Moll, and L. E. Kavraki, "The Open Motion Planning Library," *IEEE Robot. Autom. Mag.*, vol. 19, no. 4, pp. 72-82, December 2012, http://ompl.kavrakilab.org.

[26]. N. Michael, D. Mellinger, Q. Lindsey, and V. Kumar, "The GRASP multiple micro UAV testbed," *IEEE Robot, Autoin. Mag.*, vol. 17, no. 3, pp. 56-65, September, 2010,

[27]. C. Richter, A. Bry, and N. Roy, "Polynomial trajectory planning for quadrotor flight," in *Proc. of the IEEE Intl, Conf on Robot, and Autom*, Karlsruhe, Germany, May 2013, To appear.

[28]. D. Mellinger and V. Kumar, "Minimum snap trajectory generation and control for quadrotors," in *Proc. of the IEEE Intl, Conf on Robot, and Autom*, Shanghai, China, May 2011, pp. 2520-2525.

[29]. T. Lee, M. Leoky, and N. McClamroch, "Geometric tracking control of a quadrotor uav on SE(3)," in *Proc. of the Intl. Conf. on Decision and Control*, Atlanta, Ga., December 2010, pp. 5420-5425.

The subject matter described herein includes any combination of the elements or techniques described herein even if not expressly described as a combination. For example, elements or methodologies described in the section entitled Vision Based Autonomous Navigation in Complex Environments with a Quadrotor can be combined with any of the methods or elements described prior to that section.

It will be understood that various details of the subject matter described herein may be changed without departing from the scope of the subject matter described herein. Furthermore, the foregoing description is for the purpose of illustration only, and not for the purpose of limitation.

What is claimed is:

1. A system that enables autonomous control of an aerial vehicle in indoor and outdoor environments, the system comprising:
   a sensor fusion module for combining measurements from a plurality of sensors of different modalities to estimate a current state of the aerial vehicle given current and previous measurements from the sensors and a previous estimated state of the aerial vehicle, wherein the sensors include a global positioning system (GPS) receiver located on the aerial vehicle, wherein the sensor fusion module is configured to maintain smoothness in the state estimates of the aerial vehicle when GPS measurements from the GPS receiver become available after a period of unavailability by transforming a GPS measurement from the GPS receiver to be aligned with a simultaneous localization and mapping (SLAM) formulation of vehicle pose, wherein transforming the GPS measurement includes determining an optimal configuration of a pose graph using an incremental motion constraint from visual odometry, using the GPS measurement as absolute pose constraint, and using a spatial loop closure constraint, wherein the sensors include an inertial measurement unit (IMU), a laser scanner, and a camera and wherein the sensor fusion module converts relative measurements generated by the laser scanner and the camera into measurements that depend on augmented states; and
   a trajectory generator for generating a plan for controlling a trajectory of the aerial vehicle based on the estimated current state and a goal or a waypoint input provided by either a user or a higher level planner.

2. The system of claim 1 wherein the sensors include at least one of a pressure altimeter, a magnetometer, and a downward facing optical sensor.

3. The system of claim 1 wherein the sensor fusion module is configured to use an Unscented Kalman Filter (UKF) to combine the measurements from the sensors of different modalities, enabling addition and removal of sensors with minimal reconfiguration of software of the sensor fusion module.

4. The system of claim 3 wherein the sensor fusion module is configured to estimate the current state using current relative measurements and copies of augmented past states in the filter.

5. The system of claim 3 wherein the sensor fusion module is configured to fuse measurements from the sensors that arrive out of order to the filter.

6. The system of claim 1 wherein the aerial vehicle comprises a rotorcraft micro-aerial vehicle (MAV).

7. A method that enables autonomous control of an aerial vehicle in indoor and outdoor environments, the method comprising:
   combining measurements from a plurality of sensors of different modalities to generate an estimate of a current state of the aerial vehicle given current measurements from the sensors and a previous estimated state of the aerial vehicle, wherein the sensors include an inertial measurement unit (IMU), a laser scanner, a global positioning system (GPS) receiver located on the aerial vehicle, and a camera and wherein combining the measurements includes converting relative measurements generated by the laser scanner and the camera into measurements that depend on augmented state;
   generating a signal for planning a trajectory of the aerial vehicle based on the estimated current state and a goal or waypoint input by a user or a higher level planner; and
   smoothing changes in state of the aerial vehicle when GPS measurements from the GPS receiver become available after a period of unavailability by transforming a GPS measurement from the GPS receiver to be aligned with a simultaneous localization and mapping (SLAM) formulation of vehicle pose, wherein transforming the GPS measurement includes determining an optimal configuration of a pose graph using an incremental motion constraint from visual odometry, using the GPS measurement as absolute pose constraint, and using a spatial loop closure constraint.

8. The method of claim 7 wherein the sensors include at least one of a pressure altimeter, and a magnetometer.

9. The method of claim 7 wherein combining the measurements includes an Unscented Kalman Filter (UKF) to combine the measurements from the sensors of different modalities, enabling addition and removal of sensors with minimal reconfiguration of the sensor fusion module.

10. The method of claim 9 wherein estimating the current state includes using current relative measurement and copies of augmented past states in the filter.

11. The method of claim 9 comprising fusing measurements from the sensors that arrive out of order at the filter.

12. The method of claim 7 wherein the aerial vehicle comprises a rotorcraft micro-aerial vehicle (MAV).

13. A system that enables autonomous control of an aerial vehicle in indoor and outdoor environments, the system comprising:
a sensor fusion module for combining measurements from a plurality of sensors of different modalities to estimate a current state of the aerial vehicle given current and previous measurements from the sensors and a previous estimated state of the vehicle, wherein the sensors include a global positioning system (GPS) receiver located on the aerial vehicle, wherein the sensor fusion module is configured to maintain smoothness in the state estimates of the aerial vehicle when GPS measurements from the GPS receiver become available after a period of unavailability by transforming a GPS measurement from the GPS receiver to be aligned with a simultaneous localization and mapping (SLAM) formulation of vehicle pose, wherein transforming the GPS measurement includes determining an optimal configuration of a pose graph using an incremental motion constraint from visual odometry, using the GPS measurement as absolute pose constraint, and using a spatial loop closure constraint, wherein the sensor fusion module is configured to use an Unscented Kalman Filter (UKF) to combine the measurements from the sensors of different modalities, enabling addition and removal of sensors with minimal reconfiguration of software of the sensor fusion module, and wherein the sensor fusion module is configured to estimate the current state using current relative measurements and copies of augmented past states in the filter, and wherein the sensor fusion module is configured to remove augmented states from the filter and add new augmented states to the filter; and
a trajectory generator for generating a plan for controlling a trajectory of the aerial vehicle based on the estimated current state and a goal or a waypoint input provided by either a user or a higher level planner.

14. A method that enables autonomous control of an aerial vehicle in indoor and outdoor environments, the method comprising:
combining measurements from a plurality of sensors of different modalities to generate an estimate of a current state of the aerial vehicle given current measurements from the sensors and a previous estimated state of the aerial vehicle, wherein the sensors include a global positioning system (GPS) receiver located on the aerial vehicle and wherein combining the measurements includes using an Unscented Kalman Filter (UKF) to combine the measurements from the sensors of different modalities, enabling addition and removal of sensors with minimal reconfiguration of the sensor fusion module, wherein estimating the current state includes using current relative measurement and copies of augmented past states in the filter;
generating a signal for planning a trajectory of the aerial vehicle based on the estimated current state and a goal or waypoint input by a user or a higher level planner;
smoothing changes in state of the aerial vehicle when GPS measurements from the GPS receiver become available after a period of unavailability by transforming a GPS measurement from the GPS receiver to be aligned with a simultaneous localization and mapping (SLAM) formulation of vehicle pose, wherein transforming the GPS measurement includes determining an optimal configuration of a pose graph using an incremental motion constraint from visual odometry, using the GPS measurement as absolute pose constraint, and using a spatial loop closure constraint; and
removing augmented states from the filter in response to addition of a new augmented state with a binary selection matrix corresponding to that of a previous augmented state.

15. A non-transitory computer readable medium having stored thereon executable instructions that when executed by the processor of a computer controls the computer to perform steps comprising:
combining measurements from a plurality of sensors of different modalities to generate an estimate of a current state of an aerial vehicle given current measurements from the sensors and a previous estimated state of the aerial vehicle, wherein the sensors include an inertial measurement unit (IMU), a laser scanner, a camera, and a global positioning system (GPS) receiver located on the aerial vehicle and wherein the sensor fusion module converts relative measurements generated by the laser scanner and the camera into measurements that depend on augmented state;
generating a signal for planning a trajectory of the aerial vehicle based on the estimated current state and a goal or waypoint input by a user or a higher level planner; and
smoothing changes in state of the aerial vehicle when GPS measurements from the GPS receiver become available after a period of unavailability by transforming a GPS measurement from the GPS receiver to be aligned with a simultaneous localization and mapping (SLAM) formulation of vehicle pose, wherein transforming the GPS measurement includes determining an optimal configuration of a pose graph using an incremental motion constraint from visual odometry, using the GPS measurement as absolute pose constraint, and using a spatial loop closure constraint.

16. The non-transitory computer readable medium of claim 15 wherein the aerial vehicle comprises a rotorcraft micro-aerial vehicle (MAV).

* * * * *